(12) United States Patent
Salve et al.

(10) Patent No.: US 12,086,043 B1
(45) Date of Patent: Sep. 10, 2024

(54) VIRTUAL PRIVATE CLOUD RESOURCE ACTIVITY MANAGEMENT

(71) Applicant: Normalyze, Inc., Los Altos, CA (US)

(72) Inventors: Nimish Salve, Rajura (IN); Ajay Agrawal, Bangalore (IN); Yang Zhang, Los Altos, CA (US)

(73) Assignee: Normalyze, Inc., Los Altos, CA (US)

( * ) Notice: Subject to any disclaimer, the term of this patent is extended or adjusted under 35 U.S.C. 154(b) by 0 days.

(21) Appl. No.: 18/209,440

(22) Filed: Jun. 13, 2023

(51) Int. Cl.
*G06F 11/30* (2006.01)
*G06F 9/455* (2018.01)

(52) U.S. Cl.
CPC ...... *G06F 11/3006* (2013.01); *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
See application file for complete search history.

(56) References Cited

U.S. PATENT DOCUMENTS

| | | | | |
|---|---|---|---|---|
| 10,680,945 | B1 * | 6/2020 | Ye | H04L 12/4641 |
| 2019/0266502 | A1 * | 8/2019 | Moser | G06F 11/3409 |
| 2020/0104161 | A1 * | 4/2020 | Kapur | G06F 11/2041 |
| 2020/0133814 | A1 * | 4/2020 | Prabath | G06F 16/21 |
| 2022/0239681 | A1 * | 7/2022 | Newman | G06F 9/45558 |
| 2023/0244591 | A1 * | 8/2023 | Sun | G06F 11/3495 718/104 |
| 2023/0254270 | A1 * | 8/2023 | Yamakoshi | G06F 11/2028 370/219 |
| 2024/0078172 | A1 * | 3/2024 | Duggal | G06F 11/3688 |

* cited by examiner

*Primary Examiner* — Jacob D Dascomb
(74) *Attorney, Agent, or Firm* — Flagship Patents; Sikander M. Khan; Chris Volkmann

(57) ABSTRACT

The technology disclosed relates to resource activity management in a cloud environment. A computer-implemented method includes detecting a plurality of virtual networks in the cloud environment and deploying a plurality of sensors in the plurality of virtual networks using an orchestration engine of the cloud environment. Each sensor, of the plurality of sensors, includes an executable package configured to execute in a respective virtual network, of the plurality of virtual networks, independent of other sensors, of the plurality of sensors, to manage activities in the respective virtual network. The method includes identifying an activity management task to be performed in a particular virtual network of the plurality of virtual networks, sending a task command representing the activity management task to the sensor deployed in the particular virtual network, and receiving an execution result representing execution of the activity management task by the sensor deployed in the particular virtual network.

20 Claims, 17 Drawing Sheets

VIRTUAL PRIVATE CLOUD RESOURCE ACTIVITY MANAGEMENT

PRIORITY CLAIMS

This application claims the benefit of and priority to Indian Provisional Patent Application number 202311038765, "Virtual Private Cloud Resource Activity Management", filed 6 Jun. 2023. The priority application is hereby incorporated by reference in its entirety as if fully set forth herein.

FIELD OF THE TECHNOLOGY DISCLOSED

The technology disclosed generally relates to cloud environments. More specifically, but not by limitation, the present disclosure relates to improved systems and methods of cloud security posture management (CSPM), cloud infrastructure entitlement management (CIEM), cloud-native application protection platform (CNAPP), cloud-native configuration management database (CMDB), and/or data security posture management (DSPM).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cloud computing provides on-demand availability of computer resources, such as data storage and compute resources, often without direct active management by users. Thus, a cloud environment can provide computation, software, data access, and storage services that do not require end-user knowledge of the physical location or configuration of the system that delivers the services. In various examples, remote servers can deliver the services over a wide area network, such as the Internet, using appropriate protocols, and those services can be accessed through a web browser or any other computing component.

Examples of cloud storage services include Amazon Web Services™ (AWS), Google Cloud Platform™ (GCP), and Microsoft Azure™, to name a few. Such cloud storage services provide on-demand network access to a shared pool of configurable resources. These resources can include networks, servers, storage, applications, services, etc. The end-users of such cloud services often include organizations that have a need to store sensitive and/or confidential data, such as personal information, financial information, medical information. Such information can be accessed by any of a number of users through permissions and access control data assigned or otherwise defined through administrator accounts.

In some instances, a virtual network enables creation of a logically isolated section of the cloud environment, where resources such as compute resources, storage resources, load balancers, etc. can be implemented. Thus, the virtual network in the cloud can provide a software-defined network that allows multiple cloud resources to communicate with each other, just as if they were on the same physical network. The virtual network can be created by configuring a set of network resources such as virtual machines, subnets, IP addresses, and security groups. These resources are logically grouped together to form a virtual network that operates in isolation from other virtual networks in the cloud.

The discussion above is merely provided for general background information and is not intended to be used as an aid in determining the scope of the claimed subject matter.

SUMMARY

The technology disclosed relates to resource activity management in a cloud environment. A computer-implemented method includes detecting a plurality of virtual networks in the cloud environment and deploying a plurality of sensors in the plurality of virtual networks using an orchestration engine of the cloud environment. Each sensor, of the plurality of sensors, includes an executable package configured to execute in a respective virtual network, of the plurality of virtual networks, independent of other sensors, of the plurality of sensors, to manage activities in the respective virtual network. The method includes identifying an activity management task to be performed in a particular virtual network of the plurality of virtual networks, sending a task command representing the activity management task to the sensor deployed in the particular virtual network, and receiving an execution result representing execution of the activity management task by the sensor deployed in the particular virtual network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
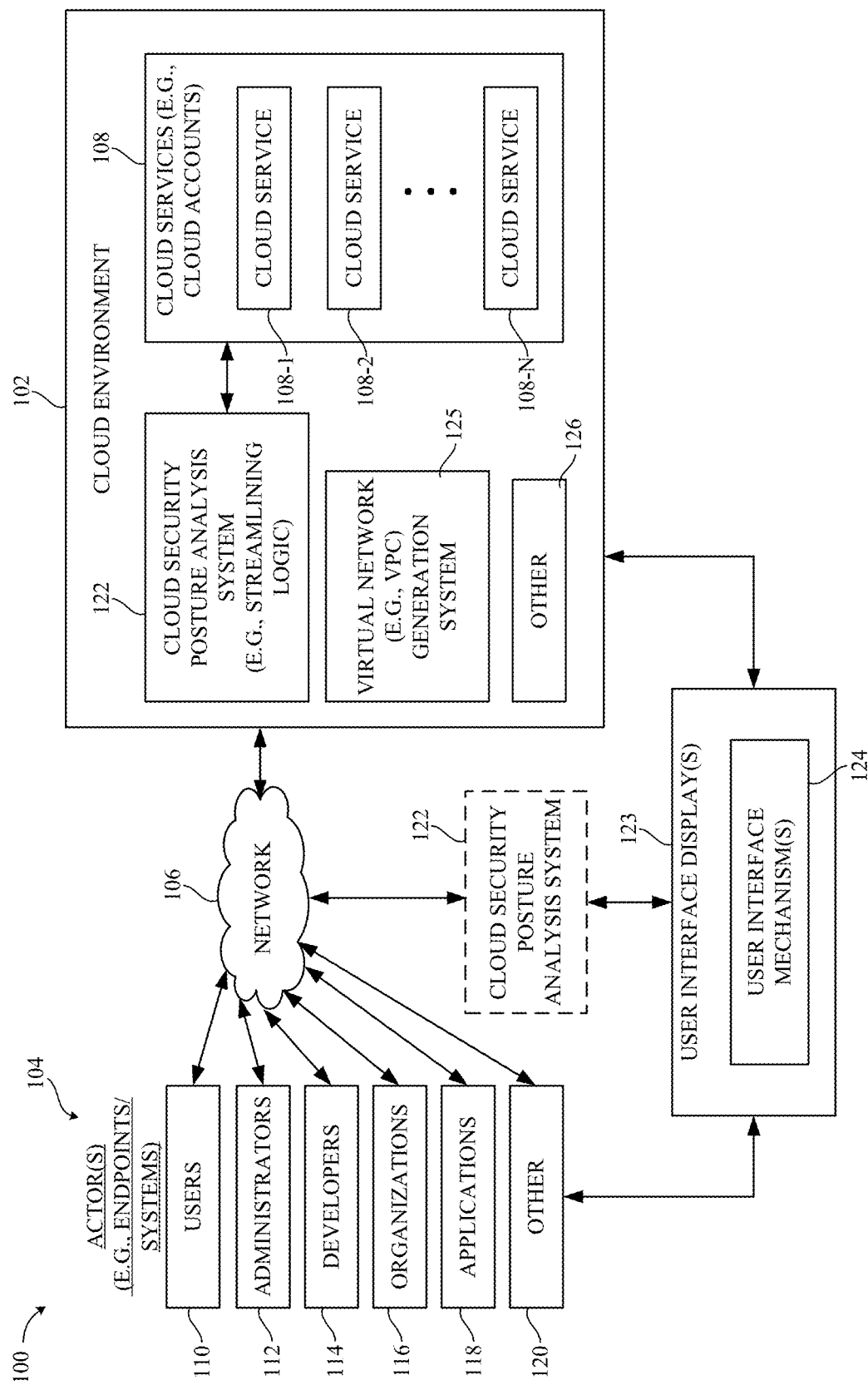
FIG. 1 is a block diagram illustrating one example of a cloud architecture.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

As noted above, virtual networks can be configured in a cloud environment that allows multiple cloud resources to communicate with each other. A virtual network can be created by configuring a set of network resources such as virtual machines, subnets, IP addresses, and security groups. These resources are logically grouped together to form a virtual network that operates in isolation from other virtual networks in the cloud. Virtual networks provide several benefits for cloud computing, including improved security, scalability, and flexibility. By using a virtual network, organizations or other end users can control the network traffic between their cloud resources and define rules to restrict access to specific resources. The users can also easily scale their network as needed and move their resources across different data centers or regions without disrupting network configurations.

One example of a virtual network is referred to as a virtual private cloud (VPC) that allows control of network configuration, including IP address range, subnets, routing tables, and network gateways. Further, security groups and network access control lists (ACLs) can be created and configured to control traffic flow in and out of the VPC. There are many different examples of virtual private clouds provided by various cloud providers. Some examples include, but are not limited to, Amazon Web Services™ (AWS) VPC, Microsoft Azure™ Virtual Network (VNet), IBM Cloud™ VPC, and Google Cloud Platform™ (GCP) VPC, to name a few. It is noted that while examples are discussed herein in the context of AWS, other types of cloud services and providers are within the scope of the present disclosure. Further, while examples are discussed herein in the context of VPCs, other types of virtual networks are within the scope of the present disclosure. Thus, features discussed in the context of a VPC are not to be construed as limited to virtual private clouds or a particular cloud provider.

In-virtual network activities (e.g., in-VPC activities) refer to network traffic or actions that occur within the virtual network that can be provisioned in a cloud account, providing control over the virtual networking environment, including the selection of IP address range, creation of subnets, and configuration of route tables and network gateways. In-virtual network activities are typically considered to be internal network traffic, and generally do not traverse the internet. This can provide additional security and help ensure that the network traffic stays within the cloud infrastructure, rather than being exposed to potential external threats. Some examples include communication between compute instances (e.g., EC2) within a same VPC, communication between a compute instance and a storage resource (e.g., RDS database) within a same VPC, traffic between a load balancer and compute instances within a same VPC, communication between a compute instance and a file system (EFS) within a same VPC, activities related to routing, activities related to network security, to name a few.

It can be difficult to manage in-VPC activities from outside the VPC. One approach for managing in-VPC activities includes making the VPC public. Here, the VPCs include a public interface that allows both inbound and outbound traffic from the Internet. In this way, all resources inside the VPC will be publicly accessible, which introduces security vulnerabilities and runs afoul of the isolation purpose of a VPC.

Another approach to managing in-VPC activities includes using VPC peering, where two VPCs are peered such that the VPCs have a network connection between them. VPC peering processes are highly manually which is susceptible to configuration errors and vulnerabilities. Also, VPC peering connections cannot be created between VPCs with matching or overlapping IPv4 CIDR blocks. Further yet, another disadvantage of VPC peering is scalability. For example, large enterprises may have hundreds of cloud accounts and each account may have multiple VPCs. This may make it virtually impossible to peer control VPCs with all other VPCs.

Yet another approach to managing in-VPC activities includes use of a private link service which creates a connection from a VPC to a specific service. However, this approach requires extensive setup and extra services such as network load balance to be deployed for each VPC. This also introduces a scalability issue.

The present disclosure is directed to a resource activity management system for managing in-network activities in VPCs or other virtual networks. For sake of illustration, but not by limitation, the system deploys a lightweight sensor into each VPC. Each sensor includes an executable package configured to execute in a respective VPC, of the plurality of VPCs, independent of the other sensors, to manage in-VPC activities in the respective VPC. Example implementations include deploying a docker image that is managed on a virtual machine (e.g., an EC2 instance in AWS, a compute engine in GCP, an AzureVM in Azure, etc.) and/or using a containerized service (e.g., AWS ECS, GCP GKE, Azure AKS, etc.). The sensor inside each VPC gets a control plane backend for task commands, runs the task against other resources within its VPC and sends results back to the control plane backend. The process to create and deploy a sensor, and create the subnet/security group, can be done automatically through a preconfigured terraform or cloud formation script, for example. After the sensor is created, the sensor's lifecycle is managed by the sensor itself and/or by a serverless function (e.g., Lambda function in AWS, Cloud Run in GCP, Azure function in Azure, etc.). If the sensor is managed by a serverless function, the function can start the sensor as needed. Once the task finishes, the sensor can be shut down to save cost.

Some examples of in-VPC activities to manage include, but are not limited to, monitoring, scanning, on-demand event execution, and event scheduling/execution. For instance, the usage and health status of resources used by different users in an organization can be monitored in different VPCs, whether in the same cloud account or in different cloud accounts. Further, resources (e.g., EBS volumes, databases, etc.) used by different users can be scanned for sensitive data and/or vulnerabilities. Further, patches or updates to workloads in the VPCs can be applied as an on-demand event. Further yet, an event can be scheduled that will trigger some activities in a plurality of VPCs in different cloud accounts. These events can run periodically based on a configurable schedule.

Aspects of the present approach provides a scalable, cost-effective solution that can be deployed fully automatically in a way that maintains security of the virtual networks can be used to monitor in-cloud activities, such as monitoring resources, trigger on-demand events, or set schedules for events that need to be run inside any VPC. At least some examples are fully distributed and asynchronous, and scalable as each sensor only manage activities for its own VPC, and the deployment in each VPC runs independently. For instance, in some examples there is no fully public interface (e.g., no interface accessible from the Internet) for each VPC which promotes security of the VPC. Further, each sensor starts when the sensor is needed to run tasks (otherwise the sensor is in a stop state), which saves processing and bandwidth cost.

Before discussing the resource activity management system in further detail, a discussion of example cloud architectures in which the system can be deployed, will be discussed.

FIG. 1 is a block diagram illustrating one example of a cloud architecture 100 in which a cloud environment 102 is accessed by one or more actors 104 through a network 106, such as the Internet or other wide area network. Cloud environment 102 includes one or more cloud services 108-1, 108-2, 108-N, collectively referred to as cloud services 108. As noted above, cloud services 108 can include cloud storage services such as, but not limited to, AWS, GCP, Microsoft Azure, to name a few.

Further, cloud services 108-1, 108-2, 108-N can include the same type of cloud service, or can be different types of cloud services, and can be accessed by any of a number of different actors 104. For example, as illustrated in FIG. 1, actors 104 include users 110, administrators 112, developers 114, organizations 116, and/or applications 118. Of course, other actors 120 can access cloud environment 102 as well.

Architecture 100 includes a cloud security posture analysis system 122 configured to access cloud services 108 to identify and analyze cloud security posture data. Examples of system 122 are discussed in further detail below. Briefly, however, system 122 is configured to access cloud services 108 and identify connected resources, entities, actors, etc. within those cloud services, and to identify risks and violations against access to sensitive information. As shown in FIG. 1, system 122 can reside within cloud environment 102 or outside cloud environment 102, as represented by the dashed box in FIG. 1. Of course, system 122 can be distributed across multiple items inside and/or outside cloud environment 102.

Architecture 100 includes a virtual network generation system 125 configured to generate virtual networks, such as virtual private clouds (VPCs), in cloud environment 102.

Users 110, administrators 112, developers 114, or any other actors 104, can interact with cloud environment 102 through user interface displays 123 having user interface mechanisms 124. For example, a user can interact with user interface displays 123 provided on a user device (such as a mobile device, a laptop computer, a desktop computer, etc.) either directly or over network 106. Cloud environment 102 can include other items 126 as well.

Figure 2:
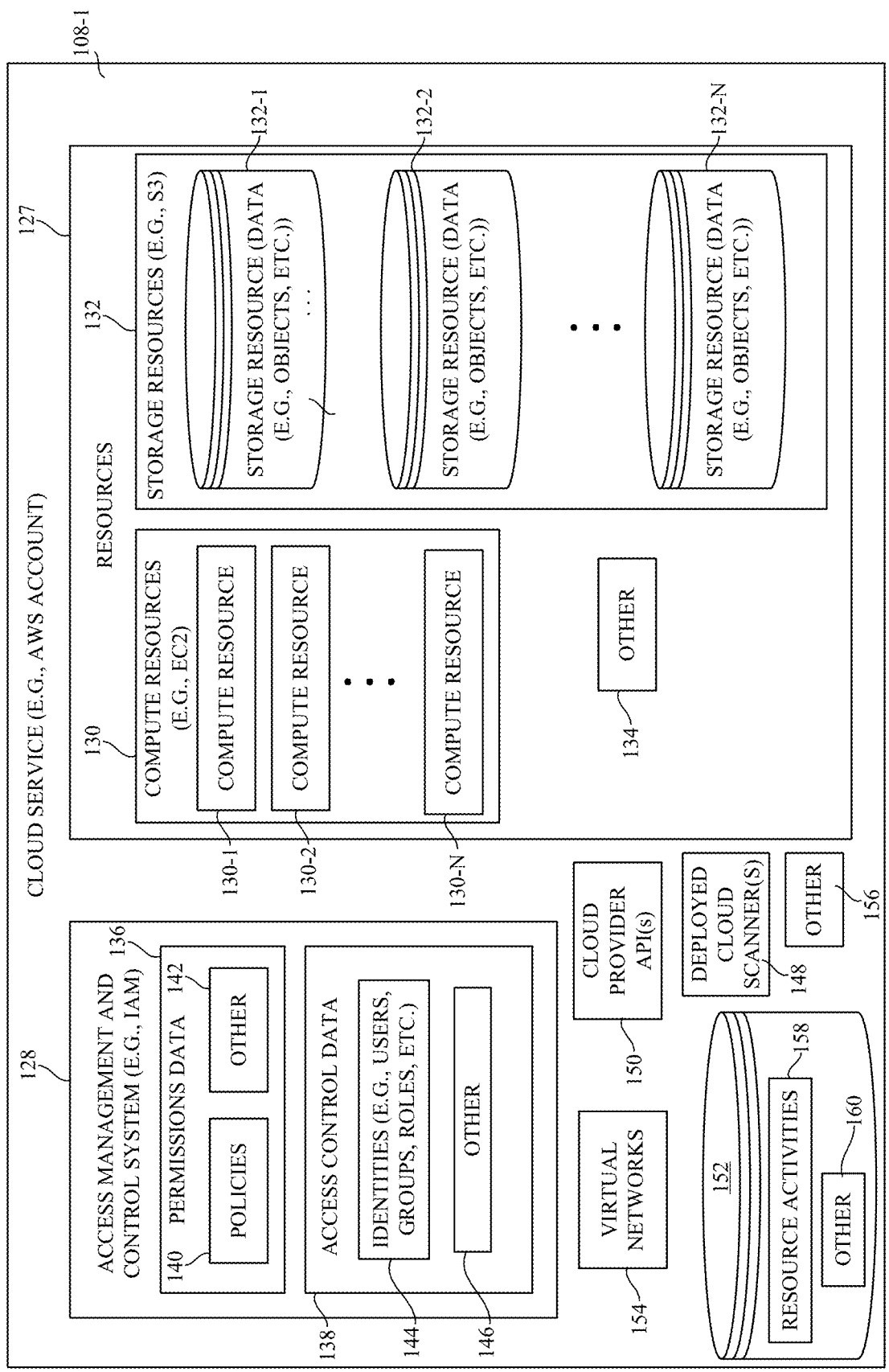
FIG. 2 is a block diagram illustrating one example of a cloud service.

FIG. 2 is a block diagram illustrating one example of cloud service 108-1. For the sake of the present discussion, but not by limitation, cloud service 108-1 will be discussed in the context of an account within AWS. Of course, other types of cloud services and providers are within the scope of the present disclosure.

Cloud service 108-1 includes a plurality of resources 127 and an access management and control system 128 configured to manage and control access to resources 127 by actors 104. Resources 127 include compute resources 130, storage resources 132, and can include other resources 134. Compute resources 130 include a plurality of individual compute resources 130-1, 130-2, 130-N, which can be the same and/or different types of compute resources. In the present example, compute resources 130 can include elastic compute resources that can be dynamically provisioned and de-provisioned as per the needs of the user or application. These resources include processing power, memory, storage, and network bandwidth that can be scaled up or down quickly to accommodate changes in demand. Elastic compute resources are often used in cloud computing environments, where virtual machines or containers can quickly and easily be provisioned with the required computing resources.

In the context of AWS, examples of elastic compute resources include EC2 (Elastic Compute Cloud) resources, Lambda resources (serverless computing service function), and ECS (Elastic Container Service).

An elastic compute cloud (EC2) is a cloud computing service designed to provide virtual machines called instances, where users can select an instance with a desired amount of computing resources, such as the number and type of CPUs, memory and local storage. An EC2 resource allows users to create and run compute instances on AWS, and can use familiar operating systems like Linux, Windows, etc. Users can select an instance type based on the memory and computing requirements needed for the application or software to be run on the instance.

An example virtual machine (VM) is a software emulation of a physical computer system, and is created by software referred to as a hypervisor, which enables multiple operating systems to run on a single physical machine simultaneously. Each virtual machine runs its own isolated environment, complete with its own virtual CPU, memory, storage, and network interface.

AWS Lambda is an event-based service that delivers short-term compute capabilities and is designed to run code without the need to deploy, use or manage virtual machine instances. An example implementation is used by an organization to address specific triggers or events, such as database updates, storage changes or custom events generated from other applications. Such a compute resource can include a serverless, event-driven compute service that allows a user to run code for many different types of applications or backend services without provisioning or managing servers.

An example serverless function is a block of code that runs in a cloud environment without the need for a dedicated server to host it. In an example serverless computing architecture, a cloud provider manages the infrastructure and automatically allocates resources to run the function when the function is triggered. The serverless functions are event-driven, meaning they are only executed in response to a specific event, such as an HTTP request or a message from a queue. When an event is triggered, the serverless function is automatically instantiated, executed, and then shut down, without the need for the user to manage any underlying infrastructure.

Other examples of elastic compute resources include, but are not limited to, Google Compute Engine, Google Kubernetes Engine, Microsoft Kubernetes Engine, Azure Virtual Machine, to name a few.

Storage resources 132 are accessible through compute resources 130, and can include a plurality of storage resources 132-1, 132-2, 132-N, which can be the same and/or different types of storage resources. A storage resource 132 can be defined based on object storage. For example, AWS Simple Storage Service (S3) provides highly-scalable cloud object storage with a simple web service interface. An S3 object can contain both data and metadata, and objects can reside in containers called buckets. Each bucket can be identified by a unique user-specified key or file name. A bucket can be a simple flat folder without a file system hierarchy. A bucket can be viewed as a container (e.g., folder) for objects (e.g., files) stored in the S3 storage resource.

Compute resources 130 can access or otherwise interact with storage resources 132 through network communication paths based on permissions data 136 and/or access control data 138. System 128 illustratively includes identity and access management (IAM) functionality that controls access to cloud service 108-1 using entities (e.g., IAM entities) provided by the cloud computing platform.

Permissions data 136 includes policies 140 and can include other permissions data 142. Access control data 138 includes identities 144 and can include other access control data 146 as well. Examples of identities 144 include, but are not limited to, users, groups, roles, etc.

Policies 140 can include identity-based policies that are attached to identities can grant permissions to the identity. Policies 140 can also include resource-based policies that are attached to resources 127. Examples include S3 bucket policies and role trust policies.

Cloud service 108-1 includes one or more deployed cloud scanners 148, cloud provider application programming interface(s) (APIs) 150, a data store 152, virtual networks 154 created by system 125, and can include other items 156 as well. Cloud scanner 148 run locally on the cloud-based services and the server systems, and can utilize elastic compute resources that can be dynamically provisioned and de-provisioned. Data store 152 stores resource activity information 158 representing resource activities managed in virtual networks 154. Data store 152 can store other items 160 as well.

Cloud scanner 148 is configured to access and scan the cloud service 108-1 on which the scanner is deployed. Examples are discussed in further detail below. Briefly, however, a scanner accesses the data stored in storage resources 132, permissions data 136, and access control data 138 to identify particular data patterns (such as, but not limited to, sensitive string patterns) and traverse or trace network communication paths between pairs of compute resources 130 and storage resources 132. The results of the scanner can be utilized to identify subject vulnerabilities, such as resources vulnerable to a breach attack, and to construct a cloud attack surface graph or other data structure that depicts propagation of a breach attack along the network communication paths.

Given a graph of connected resources, such as compute resources 130, storage resources 132, etc., entities (e.g., accounts, roles, policies, etc.), and actors (e.g., users, administrators, etc.), risks and violations against access to sensitive information is identified. A directional graph can be built to capture nodes that represent the resources and labels that are assigned for search and retrieval purposes. For example, a label can mark the node as a database or S3 resource, actors as users, administrators, developers, etc. Relationships between the nodes are created using information available from the cloud infrastructure configuration. For example, using the configuration information, system 122 can determine that a resource belongs to a given account and create a relationship between the policy attached to a resource and/or identify the roles that can be taken up by a user.

As noted above, in some examples, resources 127 can include AWS EC2 and/or Lambda resources. Also, resources 127 can include AWS Instance Stores and/or AWS Elastic Block Store (EBS) volumes. An EBS volume is a durable, block-level storage device that can attach to a compute instance and used as a physical hard drive.

Resources 127 can also include an Azure blob identified by a resource URL syntax that assigns each resource a corresponding base URL.

A cloud storage service or cloud service provider (CSP) can include an organization which hosts services such as networking, software, servers, and/or infrastructure, among others. A CSP can also provide security for the provided services. The services provided by the CSP can relieve a client organization of individual responsibility of setting and managing infrastructure. Examples of CSPs include Amazon Web Services™, Microsoft Azure™, Salesforce™, Google Cloud Platform™, among others.

A CSP generally provides a number of different interfaces to cloud-computing services, such as a service-provider interface to organizational clients for computing services. A CSP, for example, provides interfaces that allow cloud-computing clients to launch virtual machines, application programs, and other computational entities. A CSP can also provide user interface that allow claims to access, through the Internet, the services provided by the CSP. A client of the CSP can deploy web servers to access, modify, and sending information.

A cloud account provided by a CSP includes roles that determine user privileges users and what actions can be taken in the cloud account. An identify and access management (LAM) role is managed by the CSP and provides predefined roles that give granular access to specific CSP resources and prevent unwanted access to other CSP resources. For instance, an AWS IAM role includes an AWS identity with a set of permissions policies that each determine what the role can do within an AWS account. An IAM role can be assumed by anyone who needs requires the role.

For sake of illustration, but not by limitation, a service role can be assumed by an AWS service to perform actions on behalf of users. For instance, as a service that performs backup operations for a client, Amazon Data Lifecycle Manager requires that the client pass in a role to assume when performing policy operations on the client's behalf. That role must have an IAM policy with the permissions that enable Amazon Data Lifecycle Manager to perform actions associated with policy operations, such as creating snapshots and Amazon Machine Images (AMIs), copying snapshots and AMIs, deleting snapshots, and deregistering AMIs. Different permissions are required for each of the Amazon Data Lifecycle Manager policy types. The role must also have Amazon Data Lifecycle Manager listed as a trusted entity, which enables Amazon Data Lifecycle Manager to assume the role.

Figure 3:
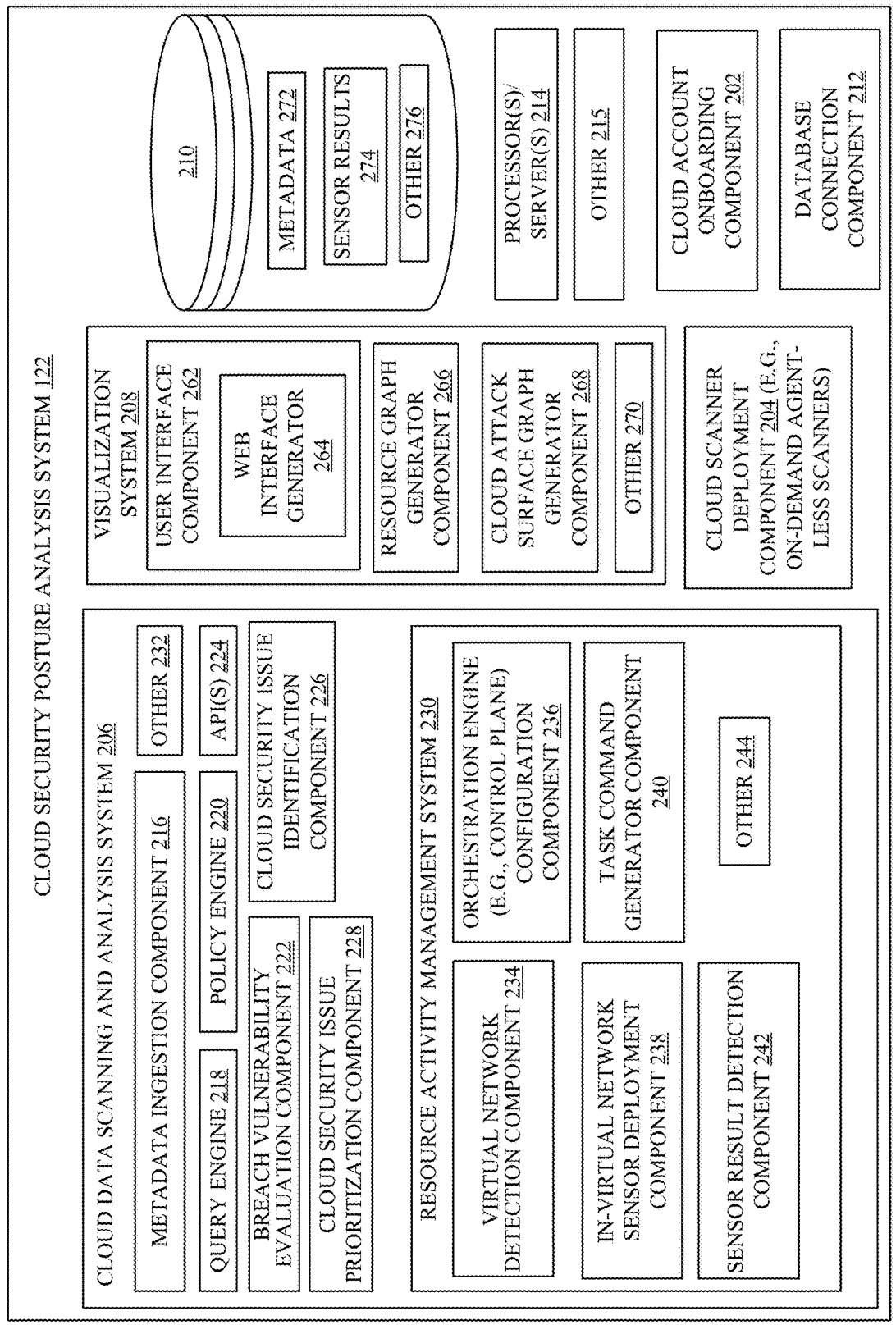
FIG. 3 is a block diagram illustrating one example of a cloud security posture analysis system.

FIG. 3 is a block diagram illustrating one example of cloud security posture analysis system 122. As noted above, system 122 can be deployed in cloud environment 102 and/or access cloud environment 102 through network 106 shown in FIG. 1.

System 122 includes a cloud account onboarding component 202, a cloud scanner deployment component 204, a cloud data scanning and analysis system 206, a visualization system 208, and a data store 210. System 122 can also include a database connection component 212, one or more processors or servers 214, and can include other items 215 as well.

Cloud account onboarding component 202 is configured to onboard cloud services 108 for analysis by system 122. After onboarding, cloud scanner deployment component 204 is configured to deploy a cloud scanner (e.g., deployed cloud scanner(s) 148 shown in FIG. 2) to the cloud service. In one example, the deployed scanners are on-demand agent-less scanners configured to perform agent-less scanning within the cloud service. One example of an agent-less scanner does not require agents to be installed on each specific device or machine. The scanners operate on resources 127 and access management and control system 128 directly within the cloud service, and generate metadata that is returned to system 122. Thus, in one example, the actual cloud service data is not required to leave the cloud service for analysis.

Cloud data scanning and analysis system 206 includes a metadata ingestion component 216 configured to receive the metadata generated by the deployed cloud scanner(s) 148. System 206 also includes a query engine 218, a policy engine 220, a breach vulnerability evaluation component 222, one or more application programming interfaces (APIs) 224, a cloud security issue identification component 226, a cloud security issue prioritization component 228, a resource activity management system 230, and can include other items 232 as well.

Query engine 218 is configured to execute queries against the received metadata and generated cloud security issue data. Policy engine 220 can execute security policies against the cloud data and breach vulnerability evaluation component 222 is configured to evaluate potential breach vulnerabilities in the cloud service. APIs 224 are exposed to users, such as administrators, to interact with system 122 to access the cloud security posture data.

Component 226 is configured to identify cloud security issues and component 228 can prioritize the identified cloud security issues based on any of a number of criteria.

Resource activity management system 230 includes a virtual network detection component 234, an orchestration engine configuration component 236, an in-virtual network sensor deployment component 238, a task command generator component 240, a sensor result detection component 242, and can include other items 244 as well.

Virtual network detection component 234 is configured to detect virtual networks (e.g., virtual private clouds) in cloud environment 102. In one example, the virtual network detection is performed through an orchestration engine configured by component 236.

An example orchestration engine includes a tool or platform that automates and manages the deployment, configuration, coordination, and monitoring of complex applications or services. The orchestration engine can provide a centralized control system that streamlines the management of multiple components and resources, such as containerized applications, across distributed systems. In addition, the orchestration engine can include features such as load balancing, automatic failover, and resource allocation to help ensure that the application is highly available and can scale dynamically to handle changing workloads. In one example, each microservice is configured to perform a specific function that deployable and scalable independently of other services.

One example orchestration engine provides a control plane having a set of services and processes that manage the virtual network infrastructure, including the configuration, security, and routing. The control plane provisions and manages components in the VPC, such as subnets, route tables, security groups, and internet gateways. The control plane provides centralized management for the VPC, and provides the ability to define and enforce policies that govern network access, security, and routing.

In AWS, a VPC control plane is provided by the AWS management console, the AWS command-line interface (CLI), and the AWS APIs. The AWS Management Console is a web-based user interface that interaction with AWS services, including ECS, through a graphical interface. With the console, users can create, configure, and manage ECS clusters and services, as well as monitor the performance and health of those services. Amazon ECS is a container orchestration service that allows users to run and manage Docker containers in the cloud. ECS manages the underlying infrastructure required to run containerized applications, including managing clusters of EC2 instances, scheduling containers onto those instances, and monitoring the health of containers and instances.

A Docker image is a lightweight, standalone, and executable package that contains functionality to run a piece of software, including code, runtime, libraries, system tools, and settings. Docker images are created using a layered file system that includes a base image, which can be customized with additional layers to create a new image. Docker images are typically built using a Dockerfile, which is a text file that contains instructions for building the image. The Dockerfile specifies the base image to use, the application code to copy into the image, any dependencies or system packages needed, and any configuration settings.

In-virtual network sensor deployment component 238 is configured to deploy a sensor into each of the virtual networks detected by component 234 and task command generator component 240 is configured to generate and send task commands to the sensors deployed in the virtual networks. The sensor inside each virtual network gets the control plane backend for the task commands, and runs the tasks against other resources within the virtual network. The sensor sends the results back to the control plane backend. Sensor result detection component 242 is configured to detect the results and provide them to other components, such as breach vulnerability evaluation component 222, cloud security issue identification component 226, and cloud security issue prioritization component 228. Further, the results can be provided to visualization system 208.

Visualization system 208 is configured to generate visualizations of the cloud security posture from system 206. Illustratively, system 208 includes a user interface component 262 configured to generate a user interface for a user, such as an administrator. In the illustrated example, component 262 includes a web interface generator 264 configured to generate web interfaces that can be displayed in a web browser on a client device.

Visualization system 208 also includes a resource graph generator component 266, a cloud attack surface graph generator component 268, and can include other items 270 as well. Resource graph generator component 266 is configured to generate a graph or other representation of the relationships between resources 127. For example, component 266 can generate a cloud infrastructure map that graphically depicts pairs of compute resources and storage resources as nodes and network communication paths as edges between the nodes.

Cloud attack surface graph generator component 268 is configured to generate a surface graph or other representation of vulnerabilities of resources to a breach attack. In one example, the representation of vulnerabilities can include a cloud attack surface map that graphically depicts propagation of a breach attack along network communication paths as edges between nodes that represent the corresponding resources.

Data store 210 stores metadata 272 obtained by metadata ingestion component 216, sensor results 274 obtained by system 230, and can store other items 276 as well.

Figure 4:
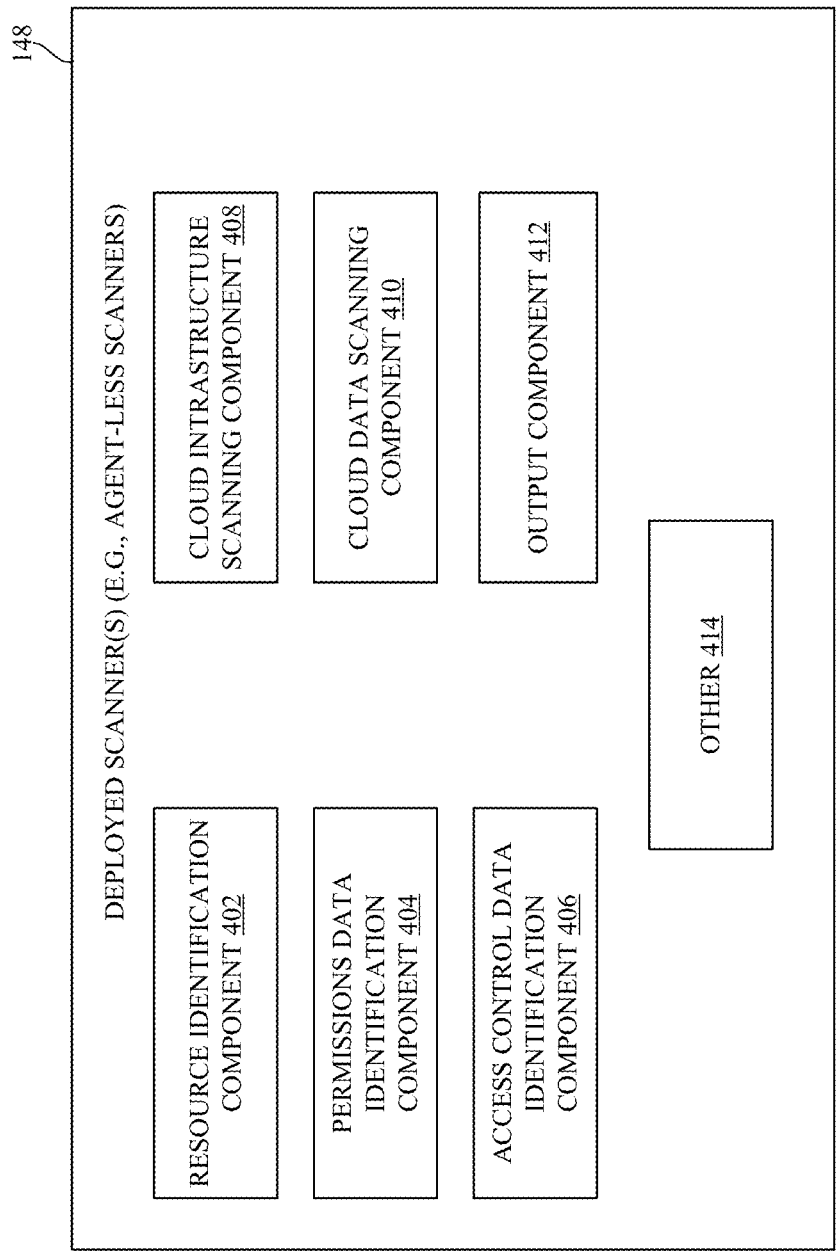
FIG. 4 is a block diagram illustrating one example of a deployed scanner.

FIG. 4 is a block diagram illustrating one example of a deployed scanner 148. Scanner 148 includes a resource identification component 402, a permissions data identification component 404, an access control data identification component 406, a cloud infrastructure scanning component 408, a cloud data scanning component 410, an output component 412, and can include other items 414 as well.

Resource identification component 402 is configured to identify the resources 127 within cloud service 108-1 (and/or other cloud services 108) and to generate corresponding metadata that identifies these resources. Permissions data identification component 404 identifies the permissions data 136 and access control data identification component 406 identifies access control data 138. Cloud infrastructure scanning component 408 scans the infrastructure of cloud service 108 to identify the relationships between resources 130 and 132 and cloud data scanning component 410 scans the actual data stored in storage resources 132. Output component 412 is configured to output the generated metadata and content-based classification results to cloud security posture analysis system 122.

The metadata generated by scanner 148 can indicate a structure of schema objects in a data store. For example, where the schema objects comprise columns in a data store having a tabular format, the returned metadata can include column names from those columns. A content-based data item classifier is configured to classify data items within the schema objects, based on content of those data items. Examples are discussed in further detail below.

Figure 5:
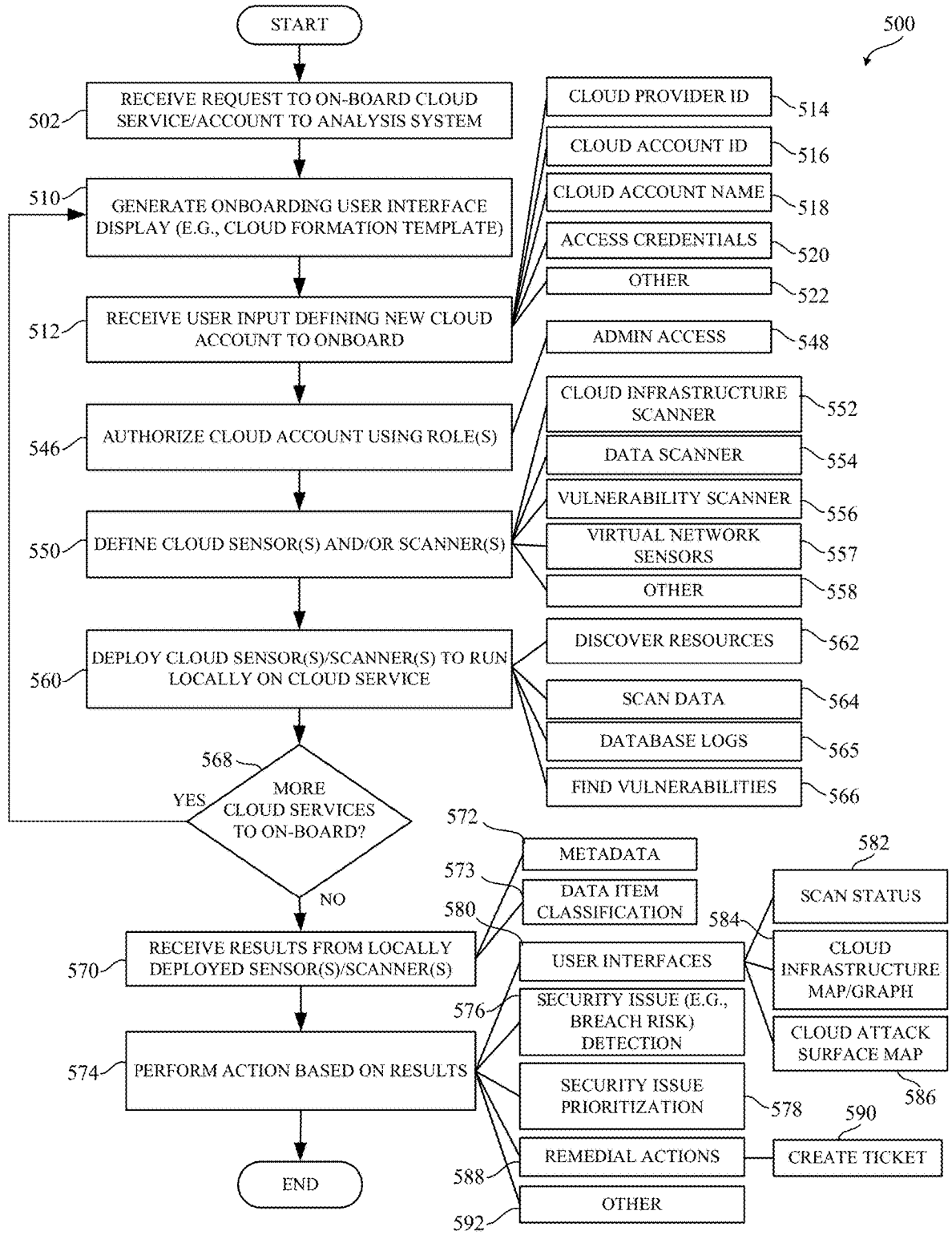
FIG. 5 is a flow diagram showing an example operation of on-boarding a cloud account and deploying one or more scanners.

FIG. 5 is a flow diagram 500 showing an example operation of system 122 in on-boarding a cloud account and deploying one or more scanners. At block 502, a request to on-board a cloud service to cloud security posture analysis system 122 is receives. For example, an administrator can submit a request to on-board cloud service 108-1.

Figure 6:
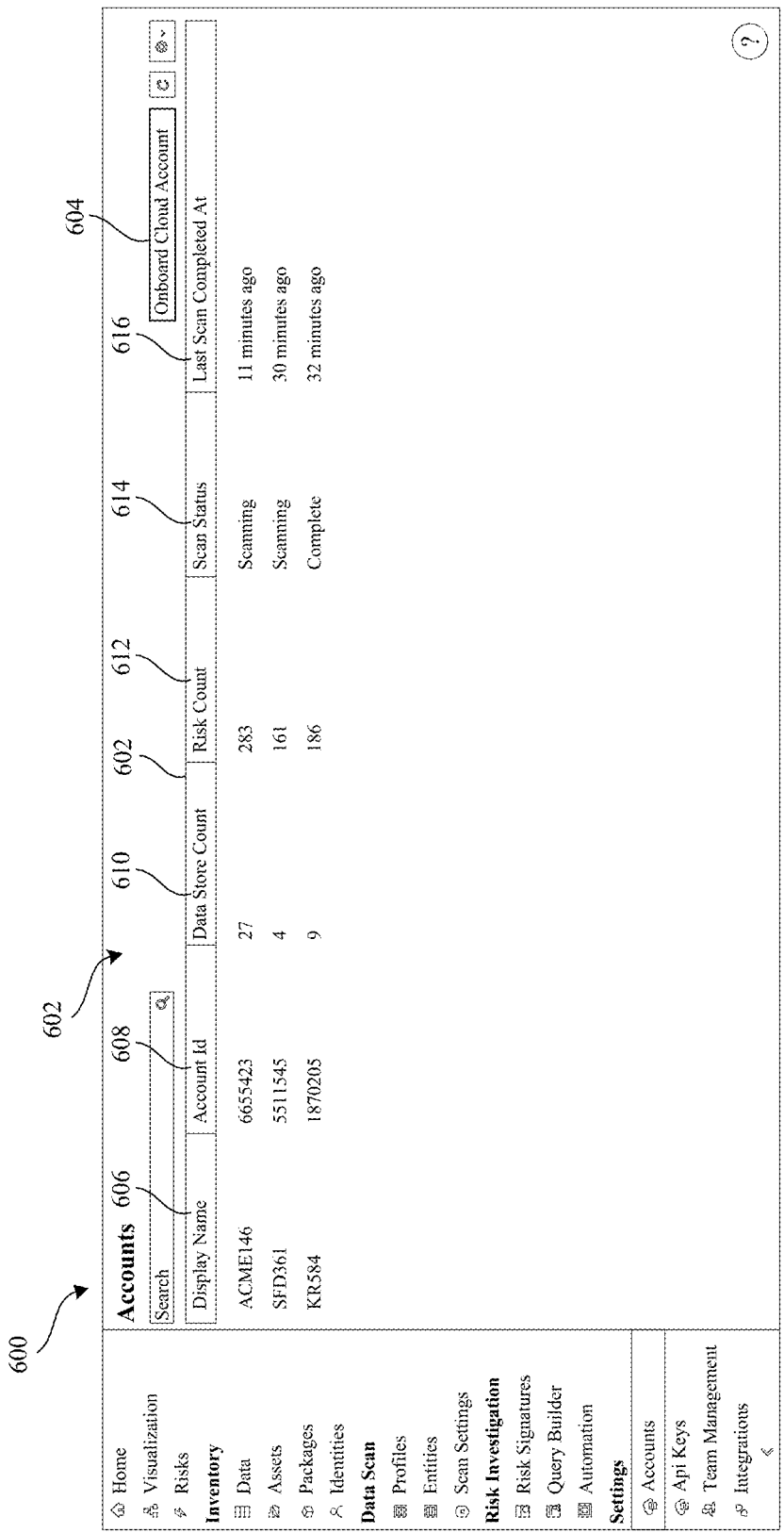
FIG. 6 illustrates one example of a user interface display representing on-boarded cloud accounts.

FIG. 6 illustrates one example of a user interface display 600 provided for an administrator. Display 600 includes a display pane 602 including a number of display elements representing cloud accounts that have been on-boarded to system 122. Display 600 includes a user interface control 604 that can be actuated to submit an on-boarding request at block 502.

Referring again to FIG. 5, at block 510, an on-boarding user interface display is generated. At block 512, user input is received that defines a new cloud account to be on-boarded. The user input can define a cloud provider identification 514, a cloud account identification 516, a cloud account name 518, access credentials to the cloud account 520, and can include other input 522 defining the cloud account to be on-boarded.

Figure 7:
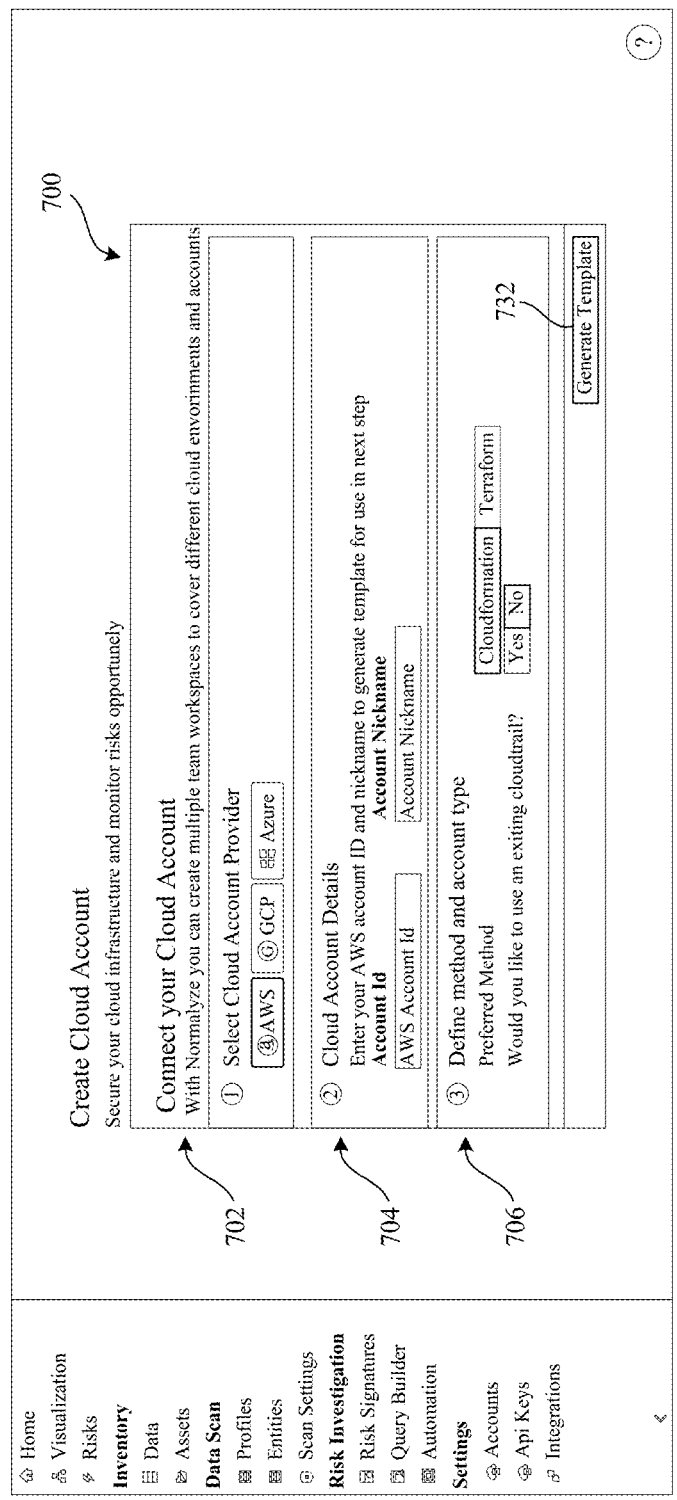
FIG. 7 illustrates one example of an on-boarding user interface display.

FIG. 7 illustrates one example of an on-boarding user interface display 700 that is displayed in response to user actuation of control 604.

Display 700 includes a user interface mechanism 702 configured to receive input to select or otherwise define a particular cloud account provider. In the illustrated example, mechanism 702 includes a plurality of selectable controls representing different cloud providers including, but not limited to, AWS, GCP, Azure.

Display 700 includes a user input mechanism 704 configured to receive input defining a cloud account identifier, and an account nickname. User input mechanisms 706 allow the user to define other parameters for the on-boarding. A user input mechanism 732 is actuated to generate a cloud formation template, or other template, to be used in the on-boarding process based on the selected cloud account provider.

Once the cloud account is connected to system 122, display 600 in FIG. 6 can be updated to show the details of the cloud account as well as the scan status. In FIG. 6, each entry includes a display name 606, an account ID 608, a data store count 610, and a risk count 612. Data store count 610 includes an indication of the number of data stores in the cloud account and the risk count 612 includes an indication of a number if identified security risks. A field 614 indicates the last scan status, such as whether the last scan has completed or whether the scanner is currently in progress or currently scanning. A field 616 indicates the time at which the last scan was completed.

Referring again to FIG. 5, at block 546, the cloud account is authorized using roles. For example, administrator access (block 548) can be defined for the cloud scanner using IAM roles. One or more cloud sensor(s) and/or scanners are defined at block 550 and can include, but are not limited to, cloud infrastructure scanners 552, cloud data scanners 554, vulnerability scanners 556, virtual network activity sensors 557 (e.g., In-VPC activity sensors), or other sensors/scanners 558.

At block 560, the cloud sensors and/or scanners are deployed to run locally on the cloud service, such as illustrated in FIG. 2. The cloud sensors and/or scanners discover resources at block 562, scan data in the resources at block 564, virtual networks at block 565, and can find vulnerabilities at block 566. As discussed in further detail below, a vulnerability can identified based on finding a predefined risk signature in the cloud service resources. The risk signatures can be queried upon, and define expected behavior within the cloud service and locate anomalies based on this data.

At block 568, if more cloud services are to be on-boarded, operation returns to block 510. At block 570, the results from the deployed sensors and/or scanners are received. As noted above, the scan results include metadata (block 572) and/or data item classifications (block 573) generated by the sensors and/or scanners running locally on the cloud service.

At block 574, one or more actions are performed based on the results. At block 576, the action includes security issue detection. For example, a breach risk on a particular resource (such as a storage resource storing sensitive data) is identified. At block 578, security issue prioritization can be performed to prioritize the detected security issues. Examples of security issue detection and prioritization are discussed in further detail below. Briefly, security issues can be detected by executing a query against the results using vulnerability or risk signatures. The risk signatures identify criterion such as accessibility of the resources, access and/or permissions between resources, and data types in accessed data stores. Further, each risk signature can be scored and prioritized based on impact. For example, a risk signature can include weights indicative of likelihood of occurrence of a breach and impact if the breach occurs.

The action can further include providing user interfaces at block 580 that indicate the scan status (block 582), a cloud infrastructure representation (such as a map or graph) (block 584), and/or a cloud attack surface representation (map or graph) (block 586). The cloud attack surface representation can visualize vulnerabilities.

Remedial actions can be taken at block 588, such as creating a ticket (block 590) for a developer or other user to address the security issues. Of course, other actions can be taken at block 592. For instance, the system can make adjustments to cloud account settings/configurations to address/remedy the security issues.

Figure 8:
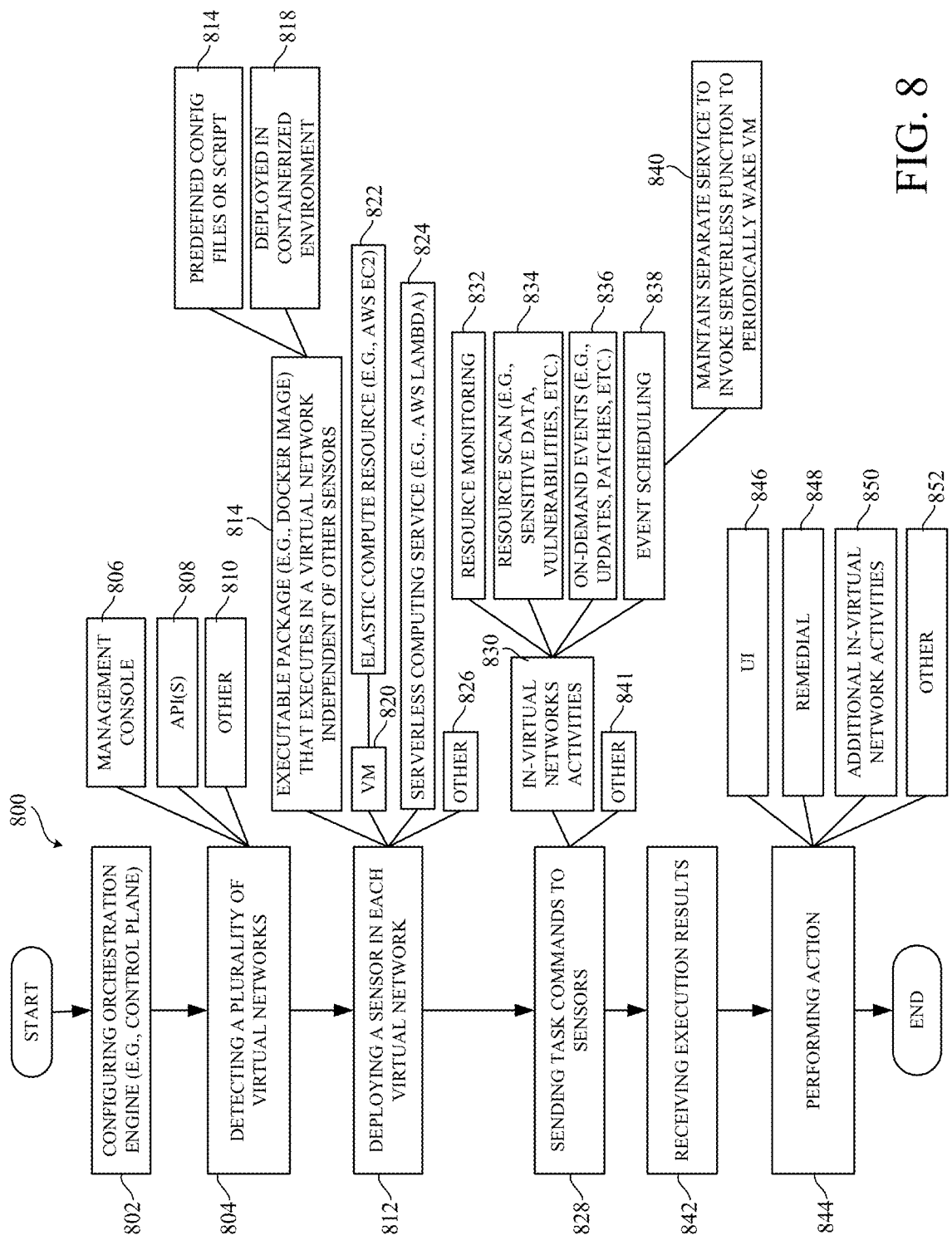
FIG. 8 is a flow diagram illustrating an example operation for managing activities for resources in a virtual private cloud or other virtual network in a cloud environment.

FIG. 8 is a flow diagram 800 illustrating an example operation for managing activities for resources in a virtual private cloud or other virtual network in a cloud environment. For sake of illustration, but not by limitation, FIG. 8 will be discussed in the context of resource activity management system 230 illustrated in FIG. 3.

At block 802, component 236 configures an orchestration engine, such as a control plane backend in the cloud environment. At block 804, a plurality of virtual networks are detected in the cloud environment by virtual network detection component 234. For example, the virtual networks are detected using a management console of the cloud provider, as indicated by block 806. Alternatively, or in addition, the virtual networks can be detected through cloud provider APIs, as represented at block 808. Of course, the virtual networks can be detected in other ways as well, as represented at block 810.

At block 812, a sensor is deployed into each of the virtual networks detected at block 804. In one example, an executable package, such as a docker image, is deployed and executes in the virtual network independent of other sensors deployed to other ones of the virtual networks, as represented at block 814. In this way, the system provides a distributed asynchronous architecture that can deploy sensors in a scalable way as each sensor only manages activities in its own virtual network and a deployment in each virtual network runs independently. Further, in some implementations there is centralized peering so the system is scalable and no fully public interface for each virtual network, which enhances security.

In one example, the executable package includes predefined configuration files or scripts, as represented at block 816. In one example, the executable package is deployed in a containerized environment, at block 818.

Examples of deployed sensors are discussed in further detail below. Briefly, however, the sensor can include a virtual machine as represented at block 820. One example includes an elastic compute resource, such as, but not limited to, an AWS EC2 instance, as represented at block 822. Alternatively, or in addition, the sensor can include a serverless computing service, such as an AWS Lambda resource at block 824. Of course, other sensors can be deployed as well, as represented at block 826.

At block 828, task commands are sent to the sensors. The task commands can request management of in-virtual network activities at block 830. For instance, the in-virtual network activities can include resource monitoring (block 832), resource scanning (block 834), on-demand events (block 836), and event scheduling (block 838). Examples of resource scanning are described in U.S. patent application Ser. No. 17/858,903, filed Jul. 6, 2022, the content of which is hereby incorporated by reference in its entirety.

In one example, at block 840, a separate service is maintained to invoke a serverless function to periodically wake the virtual machine. Of course, other task commands can be sent as well, as represented at block 841.

At block 842, execution results are received indicative of execution of the task commands in the virtual networks. At block 844, one or more actions can be performed based on the execution results. Some examples of resource scanning are described in U.S. patent application Ser. No. 17/858,903, filed Jul. 6, 2022.

The action can include generating a user interface display to display the execution results, as represented at block 846. Also, a remedial action can be performed at block 848, for example to address sensitive data and/or vulnerabilities identified at block 830. Additional in-virtual network activities can be performed at block 850. Of course, other actions can be performed as well, as represented at block 852.

Figure 9:
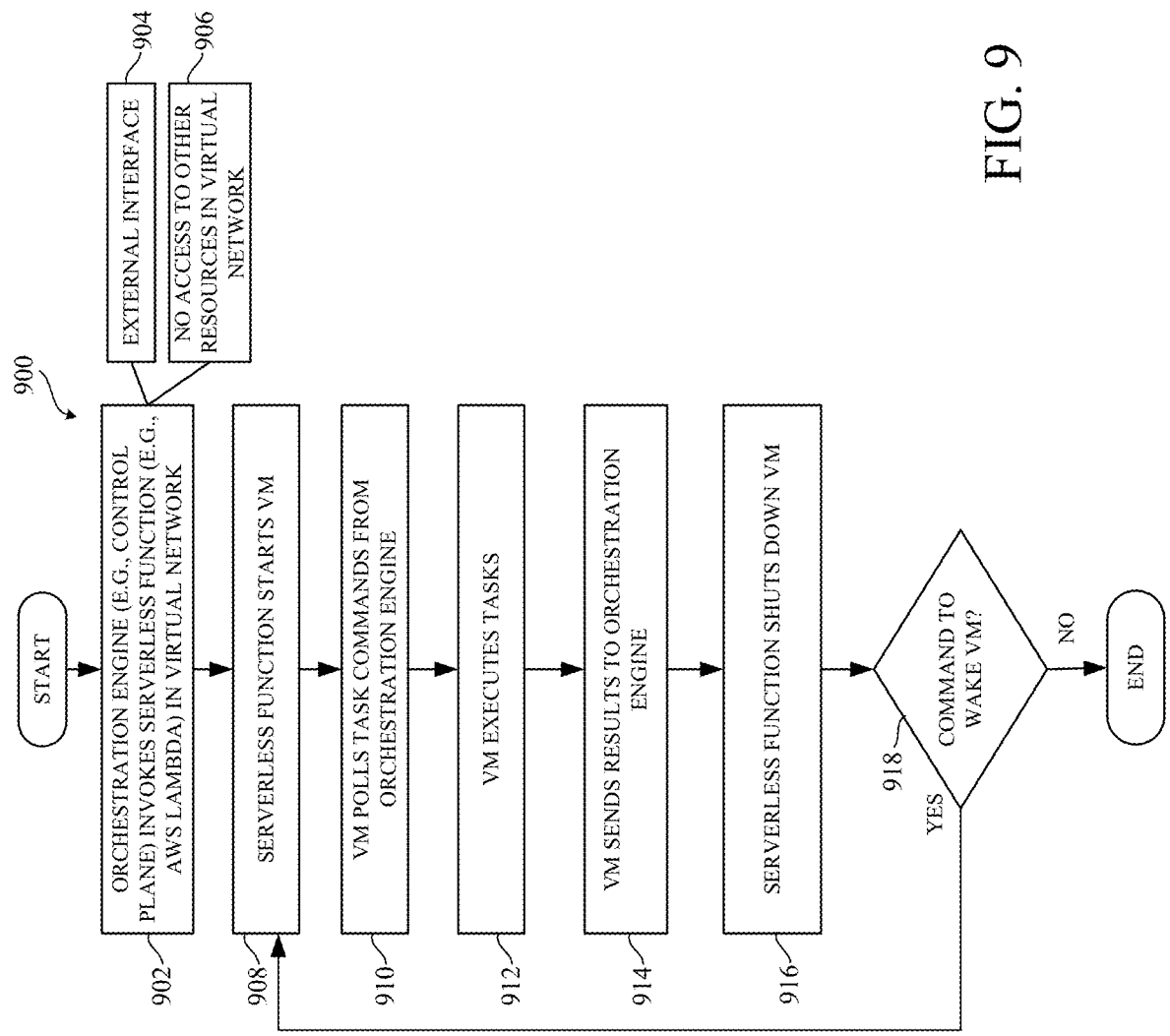
FIG. 9 is a flow diagram illustrating one example of a sensor deployed in virtual network.

FIG. 9 is a flow diagram 900 illustrating one example of a sensor deployed in virtual network. FIG. 9 will be discussed in conjunction with FIG. 10, which is a schematic diagram of a portion of a cloud environment 1000.

Figure 10:
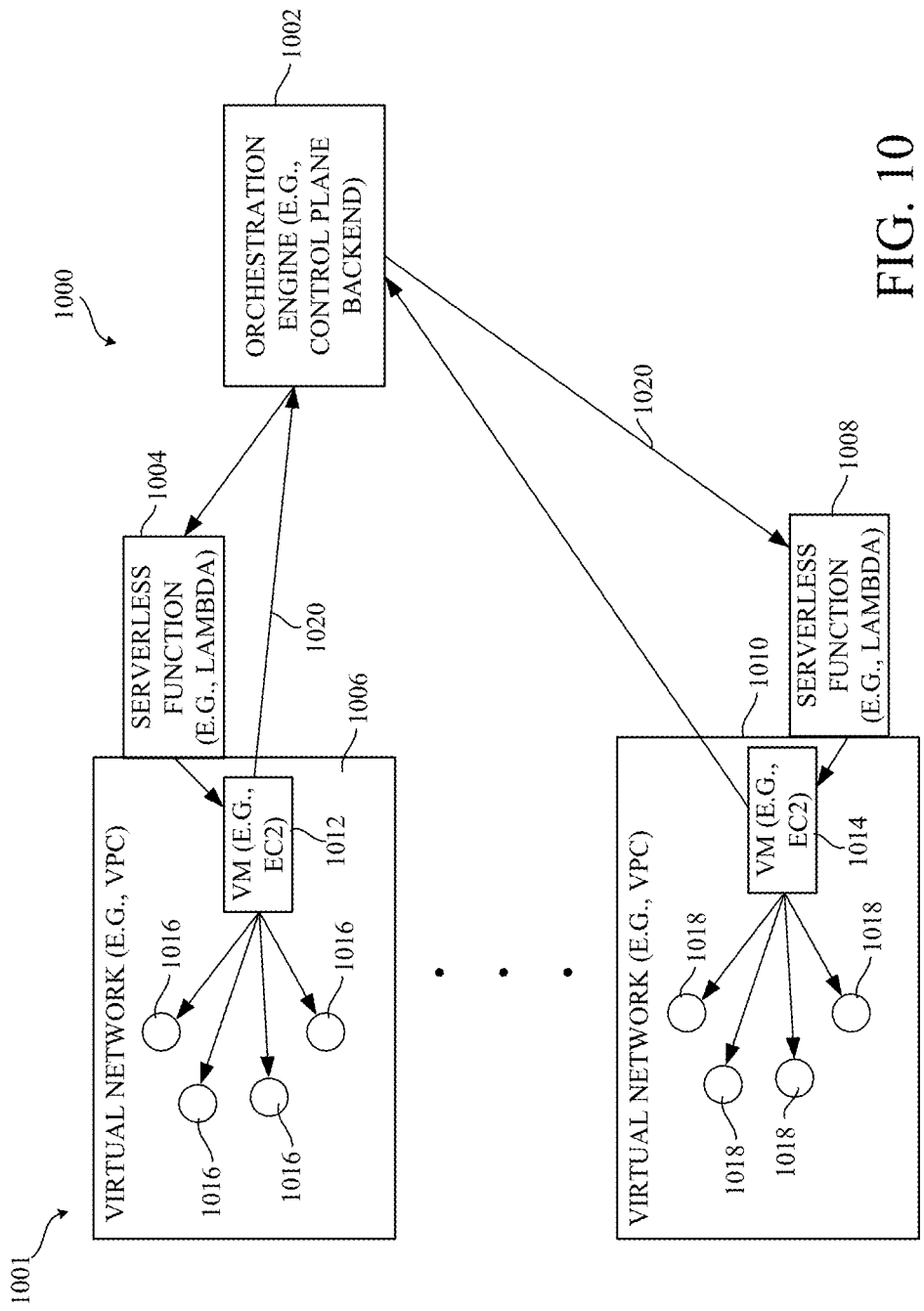
FIG. 10 is a schematic diagram of a portion of a cloud environment having sensors deployed in virtual networks.

At block 902, an orchestration engine 1002 (e.g., a control plane backend) invokes a serverless function in each virtual network of a plurality of virtual network 1001. As illustrated in FIG. 10, a serverless function 1004 is invoked in a first virtual network 1006 and a serverless function 1008 is invoked in a second virtual network 1010. For example, serverless functions 1004 and 1008 include Lambda functions.

As shown in FIG. 9, at block 904, each serverless function 1004, 1008 includes an external interface, that allows the serverless function to be accessed from outside the respective virtual networks. At block 906, serverless functions 1004, 1008 do not have access to other resources in the respective virtual networks.

At block 908, serverless functions 1004, 1008 receive initial commands from orchestration engine 1002 to start virtual machine instances 1012 and 1014 in virtual networks 1006 and 1010, respectively. Each virtual machine instance has access to a set of resources. As shown in FIG. 10, virtual machine instance 1012 can access resources 1016 and virtual machine instance 1014 can access resources 1018.

At block 910, each virtual machine instance pulls task commands from the orchestration engine. In FIG. 10, virtual machine instance 1012 pulls task commands from orchestration engine 1002 and virtual machine instance 1014 pulls task commands from orchestration engine 1002. Each virtual machine instances 1012, 1014 can include inbound and outbound rules of a security group and allows the virtual machine instance to reach outside of the virtual network but is limited to receiving requests through the serverless functions 1004, 1008. Further, each virtual machine instance can run continuously and/or can be woken up by the respective serverless function 1004, 1008.

At block 912, the virtual machine instance executes the tasks corresponding to the received task commands. Examples of task commands are discussed above with respect to block 830 in FIG. 8.

At block 914, each virtual machine instance sends execution results 1020 to the orchestration engine 1002. At block 916, the serverless function 1004, 1008 can shut down the respective virtual machine instance to save on processing costs and bandwidth.

At block 918, if a command is received to wake the virtual machine instance, the serverless function starts the virtual machine instance to again pull for task commands from the orchestration engine.

Figure 11:
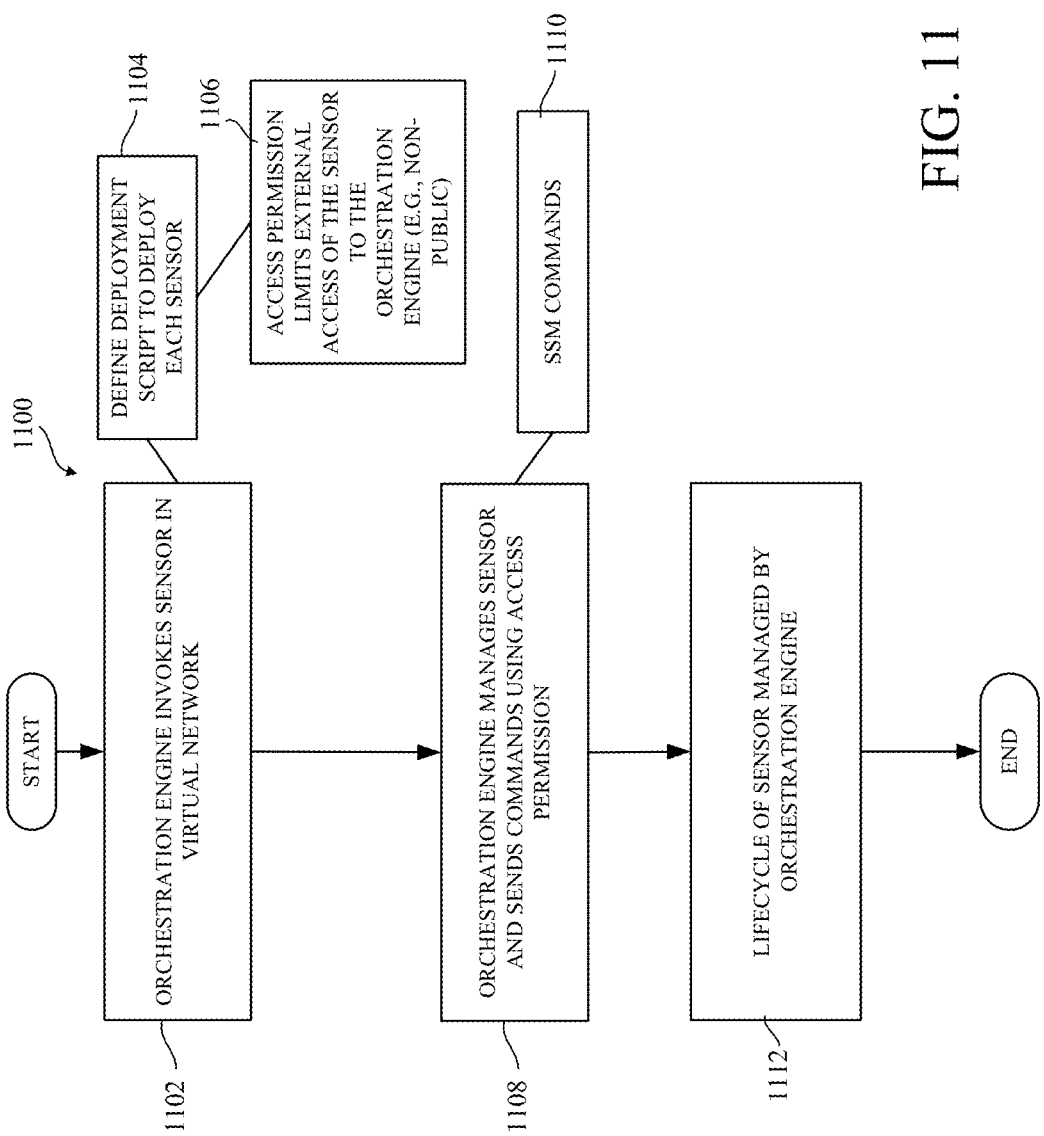
FIG. 11 is a flow diagram illustrating one example of deploying a sensor into a virtual network to manage in-virtual network activities.

FIG. 11 provides a flow diagram 1100 illustrating one example of deploying a sensor into a virtual network to manage in-virtual network activities. FIG. 11 will be discussed in conjunction with FIG. 12 which is a schematic illustration of a portion of a cloud environment 1200.

At block 1102, an orchestration engine 1202 (e.g., a control plane backend) invokes a sensor in each virtual network of a plurality of virtual networks 1201. For example, a deployment script is defined at block 1104 to deploy each sensor into one of the virtual networks 1201. The deployment can include creating access permissions that limit external access of the sensor to the orchestration engine, as represented at block 1106. The sensor is considered non-public, as access of the sensor can only be obtained through orchestration engine 1202.

Figure 12:
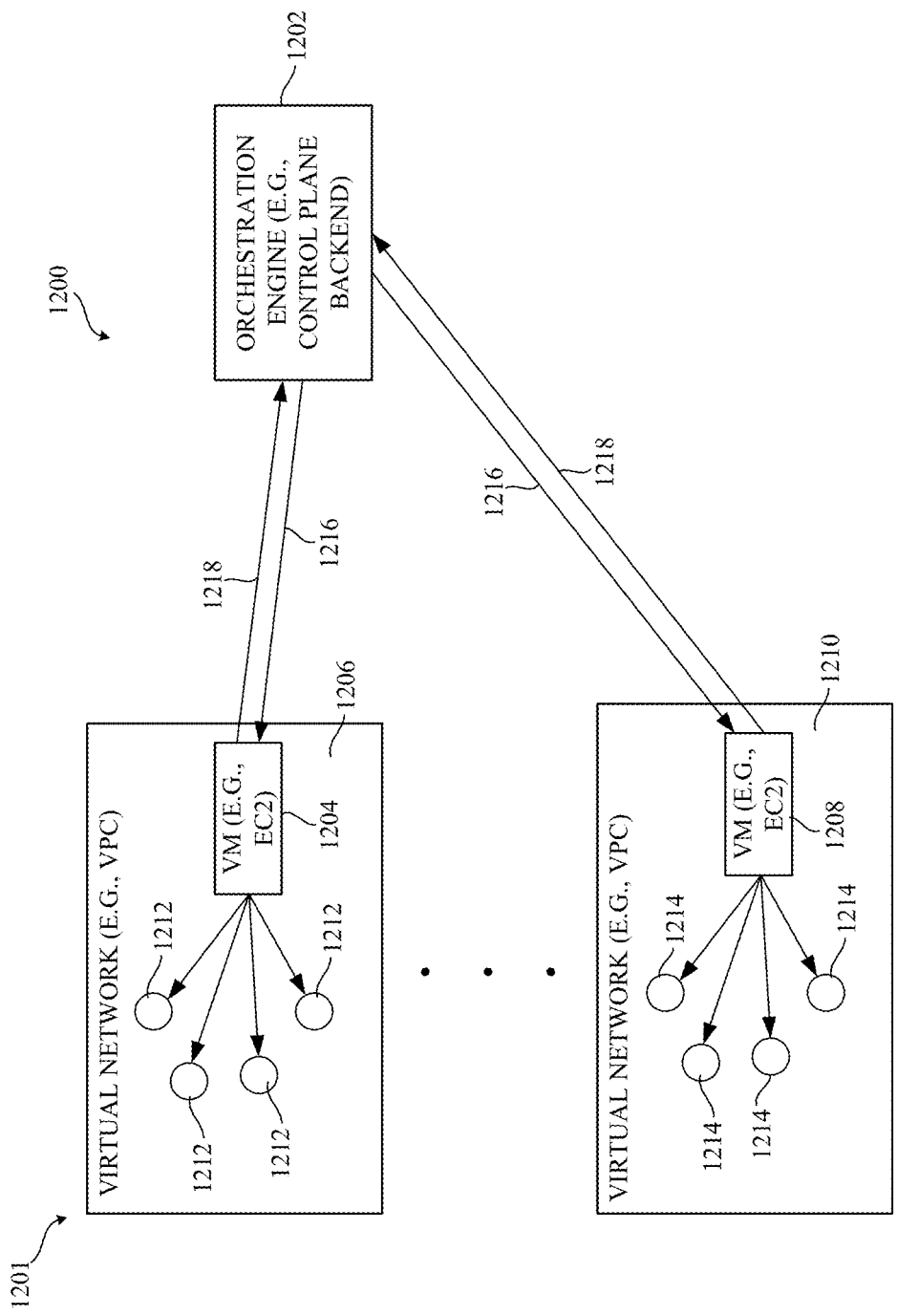
FIG. 12 is a schematic diagram of a portion of a cloud environment having sensors deployed in virtual networks.

As shown in FIG. 12, orchestration engine 1202 invokes a sensor 1204 in virtual network 1206 and invokes a sensor 1208 in virtual network 1210. Each sensor 1204 and 1208 comprise a virtual machine instance (illustratively an elastic compute resource) that has access to resources in the respective virtual network. For example, virtual machine instance 1204 has access to resources 1212 and virtual machine instance 1208 has access to resources 1214.

At block 1108, orchestration engine 1202 manages each sensor and sends task commands 1216 to the sensors, to manage in-virtual network activities, using the access permission defined at block 1106. In one example, orchestration engine 1202 communicates with each sensor using system management services (SSM) commands. SSM provides a suite of services in AWS for managing elastic compute instances and can be used to automate tasks such as patching, updating, and configuration management. In the context of other cloud providers, the commands can be sent using Google Cloud Operations Suite and Azure Operations Management Suite (OMS). Orchestration engine 1202 receives execution results 1218, from the sensors, representing execution of task commands 1216.

At block 1112, the life cycle of each sensor is managed by orchestration engine 1202 through the system management commands.

Figure 13:
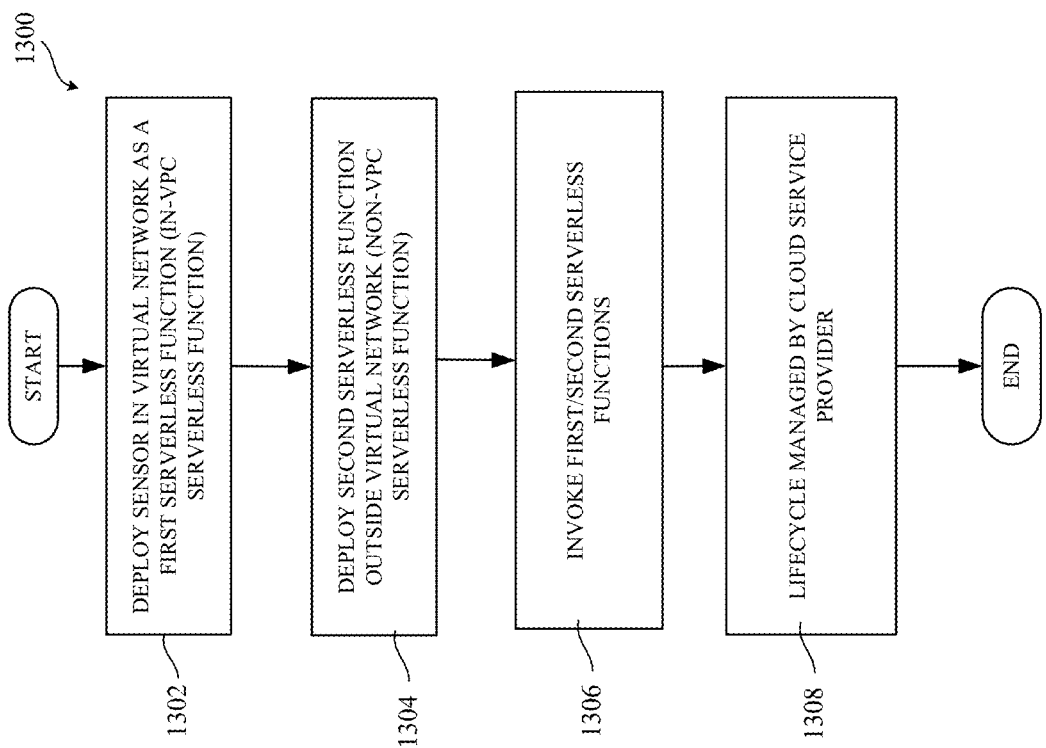
FIG. 13 is a flow diagram of one example of deploying sensors to manage in-virtual network activities.

FIG. 13 provides a flow diagram 1300 of one example of deploying sensors to manage in-virtual network activities. FIG. 13 will be discussed in the context of FIG. 14 which is a schematic diagram illustrating one example of a cloud environment 1400.

Figure 14:
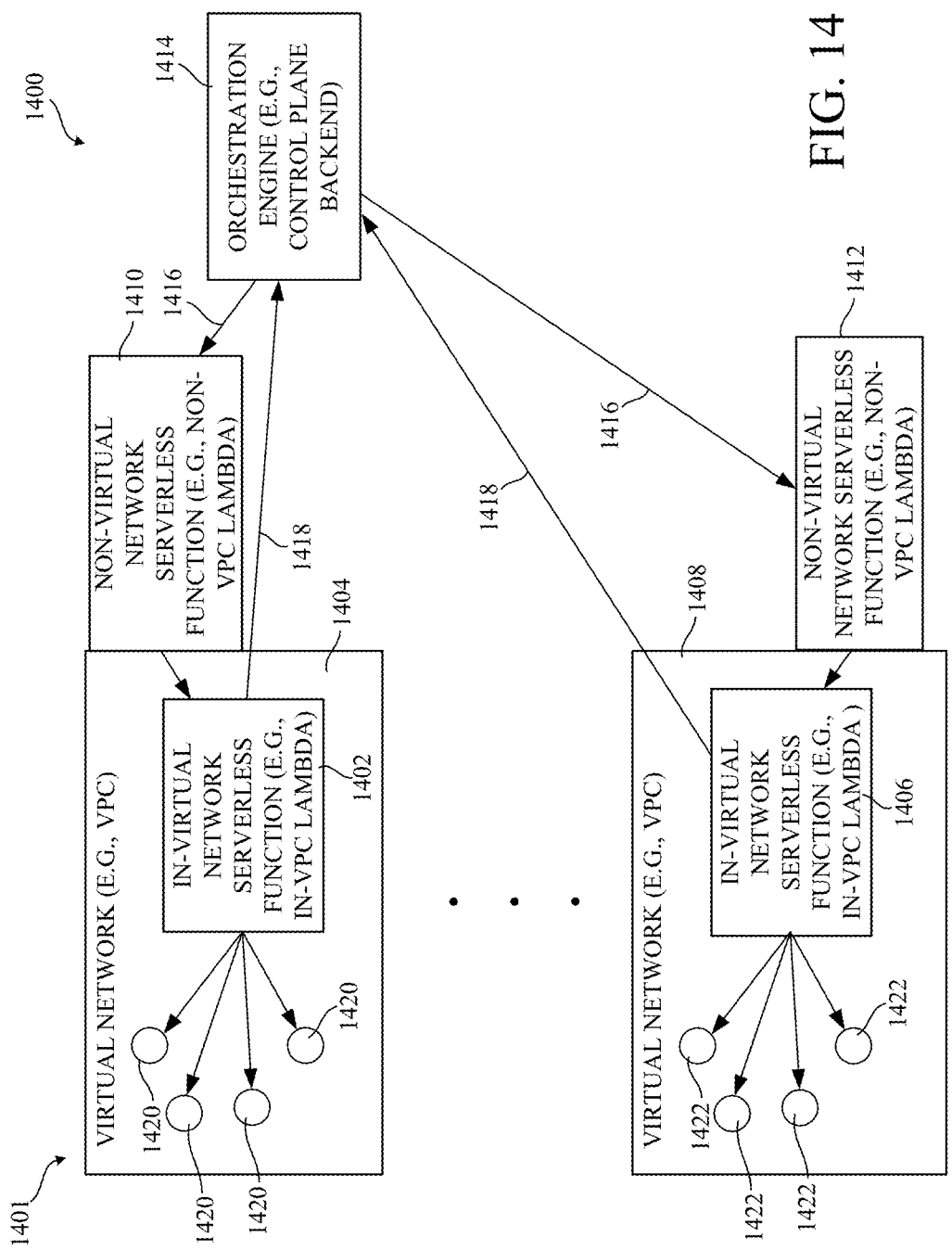
FIG. 14 is a schematic diagram of a portion of a cloud environment having sensors deployed in virtual networks.

At block 1302, a sensor is deployed in each virtual network, of a plurality of virtual networks 1401, as a first serverless function (referred to as an in-VPC serverless function). As shown in FIG. 14, a first serverless function 1402 (illustratively an in-VPC Lambda function) is deployed in virtual network 1404 and a first serverless function 1406 is deployed in virtual network 1408.

At block 1304, a second serverless function is deployed outside of the virtual network (referred to as a non-VPC serverless function). As shown in FIG. 14, a second serverless function 1410 is deployed outside of virtual network 1404 and a second serverless function 1412 is deployed outside of virtual network 1408. The in-VPC serverless function and the non-VPC serverless function can invoke each other based on their needs and the life cycle of the serverless function is managed by the service provider. Accordingly, in some instances, a serverless function will only be executed when the serverless function is in use and multiple serverless functions can be invoked simultaneously, as represented at blocks 1306 and 1308.

An orchestration engine 1414 sends task commands 1416 to the sensors (the in-virtual network serverless functions) through the non-virtual network serverless functions. Orchestration engine 1414 receives execution results 1418 from the in-virtual network serverless functions.

The second serverless function in each virtual network has access to resources in the virtual network. Illustratively, serverless function 1402 has access to resources 1420 to manage in-virtual network activities in virtual network 1404, and virtual machine instance 1406 has access to resources 1422 to manage in-virtual network activities in virtual network 1408.

It can thus be seen that the present disclosure provides technology for resource activity management in a cloud environment that allows for in-virtual network activities to be managed from outside the virtual network. The present technology deploys a lightweight sensor into each virtual network and the sensor is executable in a respective virtual network independent of other sensors, which provides a distributed and asynchronous architecture that is easily scalable. Further, there is no fully public interface for each virtual network, which enhances security. The control and scheduling configuration is on the control plane which allows for enhanced flexibility and sensor control to save costs and bandwidth.

One or more implementations of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

Examples discussed herein include processor(s) and/or server(s). For sake of illustration, but not by limitation, the processors and/or servers include computer processors with associated memory and timing circuitry, and are functional parts of the corresponding systems or devices, and facilitate the functionality of the other components or items in those systems.

Also, user interface displays have been discussed. Examples of user interface displays can take a wide variety of forms with different user actuatable input mechanisms. For instance, a user input mechanism can include icons, links, menus, text boxes, check boxes, etc., and can be actuated in a wide variety of different ways. Examples of input devices for actuating the input mechanisms include, but are not limited to, hardware devices (e.g., point and click devices, hardware buttons, switches, a joystick or keyboard, thumb switches or thumb pads, etc.) and virtual devices (e.g., virtual keyboards or other virtual actuators). For instance, a user actuatable input mechanism can be actuated using a touch gesture on a touch sensitive screen. In another example, a user actuatable input mechanism can be actuated using a speech command.

The present figures show a number of blocks with corresponding functionality described herein. It is noted that fewer blocks can be used, such that functionality is performed by fewer components. Also, more blocks can be used with the functionality distributed among more components. Further, the data stores discussed herein can be broken into multiple data stores. All of the data stores can be local to the systems accessing the data stores, all of the data stores can be remote, or some data stores can be local while others can be remote.

The above discussion has described a variety of different systems, components, logic, and interactions. One or more of these systems, components, logic and/or interactions can be implemented by hardware, such as processors, memory, or other processing components. Some particular examples include, but are not limited to, artificial intelligence components, such as neural networks, that perform the functions associated with those systems, components, logic, and/or interactions. In addition, the systems, components, logic and/or interactions can be implemented by software that is loaded into a memory and is executed by a processor, server, or other computing component, as described below. The systems, components, logic and/or interactions can also be implemented by different combinations of hardware, software, firmware, etc., some examples of which are described below. These are some examples of different structures that can be used to implement any or all of the systems, components, logic, and/or interactions described above.

The elements of the described figures, or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 15:
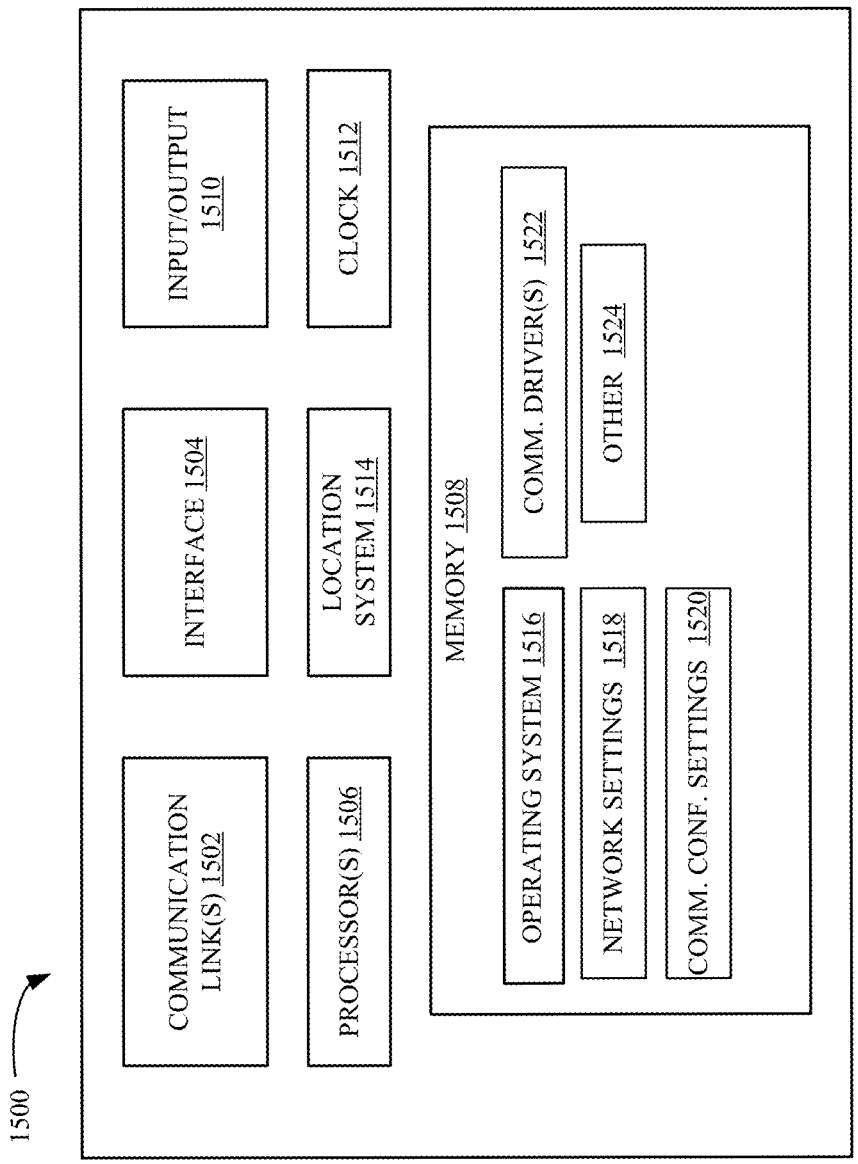
FIG. 15 is a simplified block diagram of one example of a client device.
Figure 16:
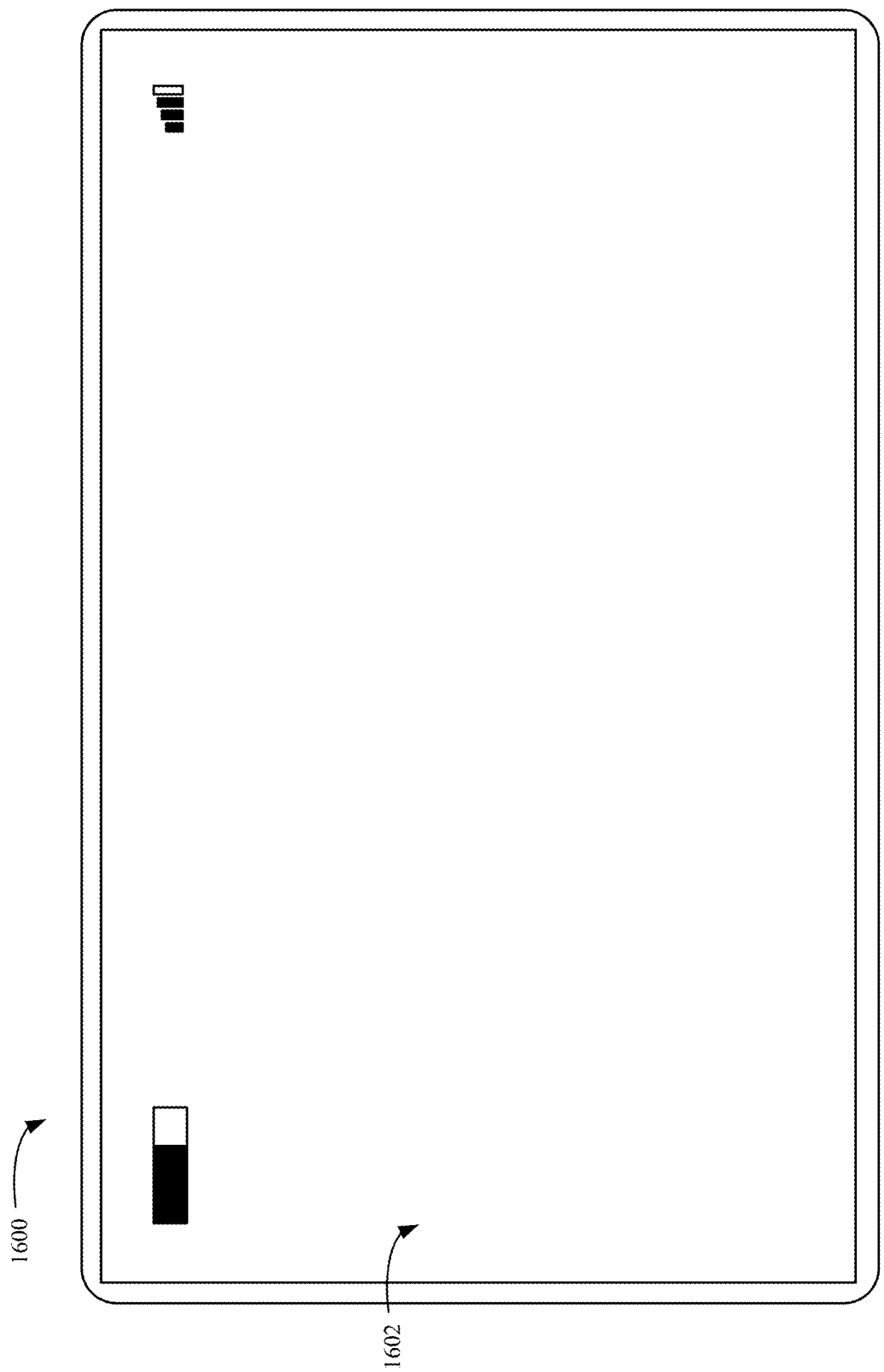
FIG. 16 illustrates an example of a handheld or mobile device.

FIG. 15 is a simplified block diagram of one example of a client device 1500, such as a handheld or mobile device, in which the present system (or parts of the present system) can be deployed. FIG. 16 illustrates an example of a handheld or mobile device.

One or more communication links 1502 allows device 1500 to communicate with other computing devices, and can provide a channel for receiving information automatically, such as by scanning. An example includes communication protocols, such as wireless services used to provide cellular access to a network, as well as protocols that provide local wireless connections to networks.

Applications or other data can be received on an external (e.g., removable) storage device or memory that is connected to an interface 1504. Interface 1504 and communication links 1502 communicate with one or more processors 1506 (which can include processors or servers described with respect to the figures) along a communication bus (not shown in FIG. 15), that can also be connected to memory 1508 and input/output (I/O) components 1510, as well as clock 1512 and a location system 1514.

Components 1510 facilitate input and output operations for device 1500, and can include input components such as microphones, touch screens, buttons, touch sensors, optical sensors, proximity sensors, orientation sensors, accelerometers. Components 1510 can include output components such as a display device, a speaker, and or a printer port.

Clock 1512 includes, in one example, a real time clock component that outputs a time and date, and can provide timing functions for processor 1506. Location system 1514 outputs a current geographic location of device 1500 and can include a global positioning system (GPS) receiver, a LORAN system, a dead reckoning system, a cellular triangulation system, or other positioning system. Memory 1508 stores an operating system 1516, network applications and corresponding configuration settings 1518, communication configuration settings 1520, communication drivers 1522, and can include other items 1524. Examples of memory 1508 include types of tangible volatile and non-volatile computer-readable memory devices. Memory 1508 can also include computer storage media that stores computer readable instructions that, when executed by processor 1506, cause the processor to perform computer-implemented steps or functions according to the instructions. Processor 1506 can be activated by other components to facilitate functionality of those components as well.

FIG. 16 illustrates one example of a tablet computer 1600 having a display screen 1602, such as a touch screen or a stylus or pen-enabled interface. Screen 1602 can also provide a virtual keyboard and/or can be attached to a keyboard or other user input device through a mechanism, such as a wired or wireless link. Alternatively, or in addition, computer 1600 can receive voice inputs.

Figure 17:
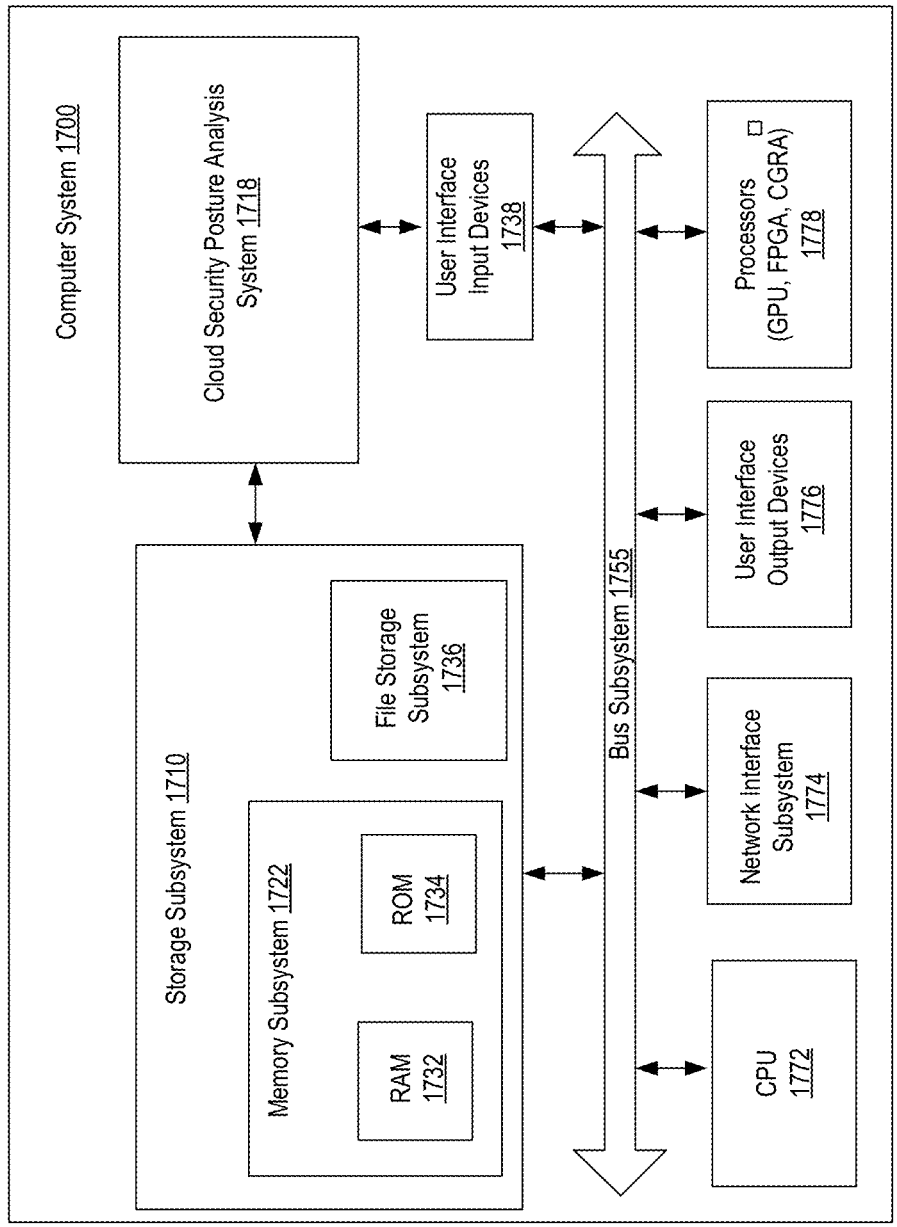
FIG. 17 shows an example computer system.

FIG. 17 shows an example computer system 1700 that can be used to implement the technology disclosed. Computer system 1700 includes at least one central processing unit (CPU) 1772 that communicates with a number of peripheral devices via bus subsystem 1755. These peripheral devices can include a storage subsystem 1710 including, for example, memory devices and a file storage subsystem 1736, user interface input devices 1738, user interface output devices 1776, and a network interface subsystem 1774. The input and output devices allow user interaction with computer system 1700. Network interface subsystem 1774 provides an interface to outside networks, including an interface to corresponding interface devices in other computer systems.

In one implementation, cloud security posture analysis system 1718 is communicably linked to the storage subsystem 1710 and the user interface input devices 1738.

User interface input devices 1738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1700.

User interface output devices 1776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1700 to the user or to another machine or computer system.

Storage subsystem 1710 stores programming and data constructs that provide the functionality of some or all of the modules and methods described herein. These software modules are generally executed by processors 1778.

Processors 1778 can be graphics processing units (GPUs), field-programmable gate arrays (FPGAs), application-specific integrated circuits (ASICs), and/or coarse-grained reconfigurable architectures (CGRAs). Processors 1778 can be hosted by a deep learning cloud platform such as Google Cloud Platform™, Xilinx™, and Cirrascale™. Examples of processors 1778 include Google's Tensor Processing Unit (TPU)™, rackmount solutions like GX4 Rackmount Series™, GX50 Rackmount Series™, NVIDIA DGX-1™, Microsoft's Stratix V FPGA™, Graphcore™ Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1722 used in the storage subsystem 1710 can include a number of memories including a main random access memory (RAM) 1732 for storage of instructions and data during program execution and a read only memory (ROM) 1734 in which fixed instructions are stored. A file storage subsystem 1736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1736 in the storage subsystem 1710, or in other machines accessible by the processor.

Bus subsystem 1755 provides a mechanism for letting the various components and subsystems of computer system 1700 communicate with each other as intended. Although bus subsystem 1755 is shown schematically as a single bus, alternative implementations of the bus subsystem can use multiple busses.

Computer system 1700 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1700 depicted in FIG. 17 is intended only as a specific example for purposes of illustrating the preferred implementations of the present invention. Many other configurations of computer system 1700 are possible having more or less components than the computer system depicted in FIG. 17.

It should also be noted that the different examples described herein can be combined in different ways. That is, parts of one or more examples can be combined with parts of one or more other examples. All of this is contemplated herein.

The technology disclosed can be practiced as a system, method, or article of manufacture. One or more features of an implementation can be combined with the base implementation. Implementations that are not mutually exclusive are taught to be combinable.

One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for resource activity management in a cloud environment, the computer-implemented method comprising:
    detecting a plurality of virtual networks in the cloud environment;
    for each respective virtual network of the plurality of virtual networks,
        invoking, by a control plane of the cloud environment, a serverless computing service comprising an interface configured to receive, from the control plane, a request to initiate a respective sensor in the respective virtual network, the control plane configured to provision resources in the plurality of virtual networks and to manage network access and routing;
        initiating, by the serverless computing service, the respective sensor in response to the request the respective sensor comprising an executable package configured to execute in the respective virtual network, independent of other sensors, to manage one or more activities on resources in the respective virtual network based on one or more commands received by the respective sensor from outside the respective virtual network;
    identifying an activity management task to be performed in a particular virtual network of the plurality of virtual networks;
    sending a task command representing the activity management task to a particular sensor deployed in the particular virtual network; and
    receiving an execution result representing execution of the activity management task by the particular sensor deployed in the particular virtual network.

2. The computer-implemented method of claim 1, wherein the plurality of virtual networks comprises a plurality of virtual private clouds (VPCs), and the activity management task comprises an in-VPC activity.

3. The computer-implemented method of claim 2, wherein the in-VPC activity comprises one or more of:
    monitoring at least one of a resource usage or a resource health of a resource in the particular virtual network;
    scanning a resource in the particular virtual network for at least one of sensitive data or a vulnerability;
    triggering an on-demand event on a resource in the particular virtual network; or
    scheduling an event on a resource in the particular virtual network.

4. The computer-implemented method of claim 1, wherein
    the control plane includes one or more services configured to manage virtual network infrastructure of the cloud environment, including one or more of configuration and security relative to the resources, and
    the respective sensor is created and deployed by the control plane using at least one of a predefined configuration file or a script.

5. The computer-implemented method of claim 1, wherein the respective sensor is deployed in a containerized environment.

6. The computer-implemented method of claim 1, wherein the respective sensor is deployed on a virtual machine.

7. The computer-implemented method of claim 6, wherein the respective sensor comprises an elastic compute resource.

8. The computer-implemented method of claim 1, and further comprising restricting access by each respective serverless computing service to resources in the particular virtual network other than the respective sensor.

9. The computer-implemented method of claim 8, wherein the sensor in the respective virtual network is configured to poll one or more activity management task commands from the control plane, execute the one or more activity management task commands, and return execution results of the one or more activity management task commands to the control plane.

10. The computer-implemented method of claim 1, wherein deploying the respective sensor comprises:
defining a deployment script to deploy the respective sensor, the deployment script including an access permission configured to allow access by the control plane to the respective sensor and limit other accesses, other than by the control plane to the respective sensor from outside the respective virtual network.

11. The computer-implemented method of claim 1, wherein the respective sensor comprises an in-network serverless computing service deployed within the respective virtual network, and further comprising:
deploying a non-network serverless computing service deployed outside the respective virtual network, wherein the non-network serverless computing service is configured to receive commands from the control plane and to invoke the in-network serverless computing service to poll one or more activity management task commands from the control plane, execute the one or more activity management task commands, and return execution results of the one or more activity management task commands to the control plane.

12. A computing system comprising:
at least one processor; and
memory storing instructions executable by the at least one processor, wherein the instructions, when executed, cause the computing system to:
detect a virtual network in a cloud environment;
implement a control plane configured to:
provision resources in the virtual network and to manage network access and routing; and
obtain a deployment script configured to deploy a sensor, the deployment script including an access permission configured to allow access by the control plane to the sensor and limit other accesses, other than by the control plane, to the sensor from outside the respective virtual network;
deploy the sensor in the virtual network,
wherein the sensor comprises an executable package deployed in the virtual network and configured to manage activities on resources in the virtual network based on commands received by the sensor from outside the virtual network;
generate an activity management task to be performed in the virtual network and to send a task command representing the activity management task to the sensor deployed in the virtual network; and
receive an execution result representing execution of the activity management task by the sensor deployed in the virtual network.

13. The computing system of claim 12, wherein the virtual network comprises a virtual private cloud (VPC), and the activity management task comprises an in-VPC activity.

14. The computing system of claim 13, wherein the in-VPC activity comprises one or more of:
monitoring at least one of a resource usage or a resource health of a resource in the virtual network;
scanning a resource in the virtual network for at least one of sensitive data or a vulnerability;
triggering an on-demand event on a resource in the virtual network; or
scheduling an event on a resource in the virtual network.

15. The computing system of claim 12, wherein the sensor is created and deployed by the control plane using at least one of a predefined configuration file or a script.

16. The computing system of claim 12, wherein the sensor is deployed on a virtual machine.

17. The computing system of claim 12, wherein the control plane is configured to:
invoke a serverless computing service in the virtual network, the serverless computing service comprising an interface configured to receive, from the control plane, a request to initiate the sensor in the virtual network.

18. A computing system comprising:
at least one processor; and
memory storing instructions executable by the at least one processor, wherein the instructions, when executed, cause the computing system to:
detect a virtual private cloud (VPC) in a cloud environment;
deploy, by a control plane of the cloud environment, a first serverless computing service comprising an interface configured to receive, from the control plane, a request to invoke a sensor in the virtual private cloud, the control plane configured to provision resources in the virtual private cloud and to manage network access and routing;
invoke, by the first serverless computing service, the sensor in the virtual private cloud, wherein the sensor comprises an executable package configured to execute a second serverless computing service in the virtual private cloud to manage in-VPC activities in the virtual private cloud;
identify an in-VPC activity management task to be performed in the virtual private cloud;
send, by the control plane, a task command representing the in-VPC activity management task to the sensor, deployed in the virtual private cloud, through the first serverless computing service outside the virtual private cloud; and
receive, by the control plane, an execution result representing execution of the in-VPC activity management task by the sensor deployed in the virtual private cloud.

19. The computing system of claim 18, wherein the instructions, when executed, cause the computing system to:
detect a plurality of virtual private clouds in the cloud environment;
deploy a plurality of sensors in the plurality of virtual private clouds using the control plane of the cloud environment, wherein the plurality of sensors are created and deployed by the control plane using at least one of a predefined configuration file or a script, and wherein each sensor, of the plurality of sensors, comprises an executable package configured to execute in a respective virtual private cloud, of the plurality of virtual private clouds, independent of other sensors, of the plurality of sensors, to manage in-VPC activities in the respective virtual private cloud.

20. The computing system of claim 19, wherein the in-VPC activities comprise one or more of:
- monitoring at least one of a resource usage or a resource health of a resource;
- scanning a resource for at least one of sensitive data or a vulnerability;
- triggering an on-demand event on a resource; or
- scheduling an event on a resource.

* * * * *